(12) United States Patent
Tsumaki et al.

(10) Patent No.: US 12,435,311 B2
(45) Date of Patent: Oct. 7, 2025

(54) LUBRICIN-LOCALIZED CARTILAGE-LIKE TISSUE, METHOD FOR PRODUCING SAME AND COMPOSITION COMPRISING SAME FOR TREATING ARTICULAR CARTILAGE DAMAGE

(71) Applicant: THE UNIVERSITY OF OSAKA, Osaka (JP)

(72) Inventors: Noriyuki Tsumaki, Kyoto (JP); Yoshiaki Takei, Tokyo (JP)

(73) Assignee: THE UNIVERSITY OF OSAKA, Osaka (JP)

( * ) Notice: Subject to any disclaimer, the term of this patent is extended or adjusted under 35 U.S.C. 154(b) by 1071 days.

(21) Appl. No.: 17/414,410

(22) PCT Filed: Dec. 20, 2019

(86) PCT No.: PCT/JP2019/050193
§ 371 (c)(1),
(2) Date: Jun. 16, 2021

(87) PCT Pub. No.: WO2020/130147
PCT Pub. Date: Jun. 25, 2020

(65) Prior Publication Data
US 2022/0056413 A1   Feb. 24, 2022

(30) Foreign Application Priority Data
Dec. 21, 2018 (JP) .................. 2018-239197

(51) Int. Cl.
*C12N 5/077* (2010.01)
*A61L 27/22* (2006.01)
*A61L 27/38* (2006.01)
*C12M 1/06* (2006.01)

(52) U.S. Cl.
CPC ........... *C12N 5/0655* (2013.01); *C12M 27/02* (2013.01); *A61L 27/227* (2013.01); *A61L 27/3852* (2013.01); *C12N 2500/30* (2013.01); *C12N 2501/15* (2013.01); *C12N 2501/155* (2013.01); *C12N 2501/19* (2013.01); *C12N 2506/02* (2013.01); *C12N 2506/45* (2013.01); *C12N 2527/00* (2013.01)

(58) Field of Classification Search
CPC .................................................. C12N 5/0655
See application file for complete search history.

(56) References Cited

U.S. PATENT DOCUMENTS 10,557,121 B2 * 2/2020 Tsumaki ................ A61P 19/04
2018/0251732 A1   9/2018 Tsumaki

FOREIGN PATENT DOCUMENTS

| EP | 3 064 577    | 9/2016  |
|----|--------------|---------|
| JP | 2005-506860  | 3/2005  |
| JP | 2005-515796  | 6/2005  |
| JP | 2006-51157   | 2/2006  |
| JP | 2011-519933  | 7/2011  |
| WO | 02/062961    | 8/2002  |
| WO | 03/024463    | 3/2003  |
| WO | 2009/137217  | 11/2009 |
| WO | 2014/052912  | 4/2014  |
| WO | 2014/070797  | 5/2014  |
| WO | 2016/133208  | 8/2016  |

OTHER PUBLICATIONS

Jones et al., "Binding and localization of recombinant lubricin to articular cartilage surfaces". J Orthop Res. Mar. 2007;25(3):283-92. (Year: 2007).*
Roberts et al., "Immunohistochemical Study of Collagen Types I and II and Procollagen IIA in Human Cartilage Repair Tissue Following Autologous Chondrocyte Implantation", *The Knee*, vol. 16, issue 5, pp. 398-404 (2009).
Wu et al., "The Effect of the Microgravity Rotating Culture System on the Chondrogenic Differentiation of Bone Marrow Mesenchymal Stem Cells", *Mol. Biotechnol.*, vol. 54, No. 2, pp. 331-336 (published online Jun. 6, 2012).
Mithoefer et al., "Clinical Efficacy of the Microfracture Technique for Articular Cartilage Repair in the Knee", *The American Journal of Sports Medicine*, vol. 37, No. 10, pp. 2053-2063 (published online Feb. 26, 2009).
Yu et al., "Simulated Microgravity Using a Rotary Cell Culture System Promotes Chondrogenesis of Human Adipose-derived Mesenchymal Stem Cells via the p38 MAPK Pathway", *Biochem. Biophys. Res. Commun.*, vol. 414, No. 2, pp. 412-418 (published online Sep. 28, 2011).
Wang et al., "Regulation of Adult Human Mesenchymal Stem Cells into Osteogenic and Chondrogenic Lineages by Different Bioreactor Systems", *J. Biomed. Mater. Res.*, vol. 88A, pp. 935-946 (published online Apr. 2, 2008).

(Continued)

*Primary Examiner* — Allison M Fox
*Assistant Examiner* — Hanan Isam Abuzeineh
(74) *Attorney, Agent, or Firm* — GREENBLUM & BERNSTEIN, P.L.C.

(57) ABSTRACT

The present invention provides: a lubricin-localized cartilage-like tissue characterized in that, when in an arbitrary cross section passing a first center of mass of a cartilage-like tissue derived from pluripotent stem cells or a center-of-mass region, which is a portion inside a concentric sphere being centered at the first center of mass and having a diameter of [first major diameter×0.2], the expression level of lubricin per unit area contained in a central region, which is a portion inside a concentric circle being centered at a second center of mass that is the center of mass of the cross section and having a diameter of [major diameter of cross section (second major diameter)×(0.4 to 0.9)] is referred to as the central lubricin level and the expression level of lubricin per unit area contained in the non-central region is referred to as the non-central lubricin level.

6 Claims, 11 Drawing Sheets

(56) References Cited

OTHER PUBLICATIONS

Grad et al., "Chondrocyte Gene Expression Under Applied Surface Motion ", *Biorheology*, vol. 43, pp. 259-269 (2006).

Candrian et al., "Engineered Cartilage Generated by Nasal Chondrocytes Is Responsive to Physical Forces Resembling Joint Loading", *Arthritis & Rheumatism*, vol. 58, No. 1, pp. 197-208 (published online Dec. 28, 2007).

Luo et al., "Engineering Zonal Cartilaginous Tissue by Modulating Oxygen Levels and Mechanical Cues Through the Depth of Infrapatellar Fat Pad Stem Cell Laden Hydrogels", *J. Tissue Eng. Regen. Med.*, vol. 11, issue 9, pp. 2613-2628 (published online May 3, 2016).

Klein et al., "Tissue Engineering of Stratified Articular Cartilage from Chondrocyte Subpopulations", *OsteoArthritis and Cartilage*, vol. 11, No. 8, pp. 595-602 (2003).

Thorpe et al., "Modulating Gradients in Regulatory Signals within Mesenchymal Stem Cell Seeded Hydrogels: A Novel Strategy to Engineer Zonal Articular Cartilage", *PLOS One*, vol. 8, issue 4, e60764, pp. 1-13 (Apr. 16, 2013).

Park et al., "Effect of Joint Mimicking Loading System on Zonal Organization into Tissue-engineered Cartilage", *PLOS One*, vol. 13, issue 9, e0202834, pp. 1-12 (Sep. 12, 2018).

Nakagawa et al., "Cartilage Derived from Bone Marrow Mesenchymal Stem Cells Expresses Lubricin In Vitro and In Vivo", *PLOS One*, vol. 11, issue 2, e0148777, pp. 1-19 (Feb. 11, 2016).

Middendorf et al., "Mechanical Properties and Structure-Function Relationships of Human Chondrocyte-Seeded Cartilage Constructs After In Vitro Culture", *Journal of Orthopaedic Research*, vol. 35, pp. 2298-2306 (published online Mar. 20, 2017).

Bonnevie et al., "Enhanced Boundary Lubrication Properties of Engineered Menisci by Lubricin Localization with Insulin-like Growth Factor I Treatment", *Journal of Biomechanics*, vol. 47, pp. 2183-2188 (published online Oct. 22, 2013).

International Search Report issued in PCT/JP2019/050193, dated Mar. 24, 2020, along with an English translation thereof.

Written Opinion of the International Searching Authority issued in PCT/JP2019/050193, dated Mar. 24, 2020, along with an English translation thereof.

International Preliminary Report on Patentability issued in PCT/JP2019/050193, issued Jun. 16, 2021, along with an English translation thereof.

Lee et al., "Regulation of Lubricin for Functional Cartilage Tissue Regeneration: A Review", *Biomaterials Research*, vol. 22, No. 1, pp. 1-10 (2018).

Supplementary European Search Report issued in EP Patent Application No. 19900846.7, dated Jan. 26, 2022.

* cited by examiner

FIG. 3B

| Experiment conditions | Safranin O stained image | | |
|---|---|---|---|
| Example — After stirring (30 days) | Day30.1 | Day30.2 | Day30.3 |
| Comparative Example — After stirring (0 days) | Day0.1 | Day0.2 | Day0.3 |

FIG. 4

*Bold entries indicate localization

| With or without stirring | Days cultured | Sample name | Tissue long diameter(mm) | Superficial zone peripheral area(μm) | Central region diameter/tissue long diameter(%) | Mean gray value-BG ratio, non-central region/central region | Average | 95%C.I. |
|---|---|---|---|---|---|---|---|---|
| Without | 0 days | Day0_1 | 1.89 | 369 | 80.5% | 0.535 | 0.61 | 0.41 |
| | | Day0_2 | 1.41 | 162 | 88.5% | 0.447 | | |
| | | Day0_3 | 2.11 | 396 | 81.3% | 0.835 | | |
| With | 30 days | Day30_1 | 1.95 | 426 | 78.1% | 1.834 | 2.43 | 1.81 |
| | | Day30_2 | 1.66 | 366 | 77.9% | 3.453 | | |
| | | Day30_3 | 1.44 | 721 | 49.7% | 2.000 | | |

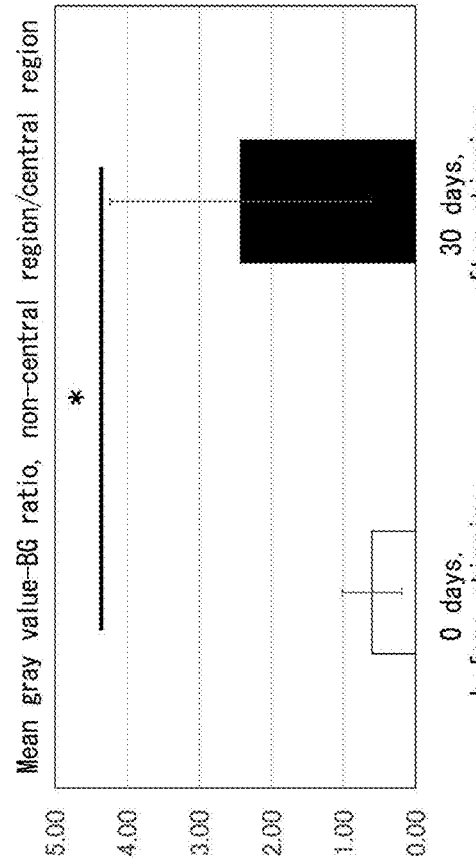

Mean gray value-BG ratio, non-central region/central region 0 days, before stirring | 30 days, after stirring

* $p<0.05$
Error bar means 95%C.I.

FIG. 5A

| Experiment conditions | Lubricin immunostained image (DAB coloring) | | |
|---|---|---|---|
| Example / With stirring | 1wk.r.1 | 2wk.r.4 | 4wk.r.1 |
| Comparative Example / Without stirring | 1wk.s.3 | 2wk.s.2 | 4wk.s.2 |

FIG. 6A

*Bold entries indicate localization

| With or without stirring | Days cultured | Sample name | Tissue long diameter (mm) | Superficial zone peripheral area (μm) | Central region diameter/tissue long diameter (%) | Mean gray value-BG ratio, non-central region/central region | Average | 95%C.I. |
|---|---|---|---|---|---|---|---|---|
| Without | 0 days | 0w_1 | 1.265887 | 365.4 | 71.1% | 0.484551 | | |
| | | 0w_2 | 1.511207 | 295.1 | 80.5% | 0.406699 | | |
| | | 0w_3 | 1.333128 | 278.6 | 79.1% | 0.458984 | 0.612498 | 0.248997 |
| | | 0w_4 | 2.762438 | 607.7 | 78.0% | 0.86207 | | |
| | | 0w_5 | 3.663149 | 1518.2 | 58.6% | 0.850186 | | |
| With | 7 days | 1w_s_1 | 1.837438 | 327.5 | 82.2% | 0.755434 | | |
| | | 1w_s_2 | 1.862192 | 193.2 | 89.6% | 0.815027 | | |
| | | 1w_s_3 | 2.074507 | 308.0 | 85.2% | 0.897476 | 0.85507 | 0.063784 |
| | | 1w_s_4 | 3.253651 | 762.6 | 76.6% | 0.946635 | | |
| | | 1w_s_5 | 3.131838 | 469.8 | 85.0% | 0.872679 | | |
| | | 1w_s_6 | 3.826029 | 767.0 | 80.0% | 0.843167 | | |
| With | 7 days | 1w_r_1 | 1.652896 | 322.2 | 80.5% | 0.694908 | | |
| | | 1w_r_2 | 1.28202 | 420.0 | 67.2% | 0.858826 | | |
| | | 1w_r_3 | 1.15702 | 334.7 | 71.1% | 0.675792 | 0.871073 | 0.214064 |
| | | 1w_r_4 | 2.930573 | 525.1 | 82.1% | 1.009621 | | |
| | | 1w_r_5 | 2.785099 | 646.3 | 76.8% | 1.116218 | | |

FIG. 6B

*Bold entries indicate localization

| With or without stirring | Days cultured | Sample name | Tissue long diameter(mm) | Superficial zone peripheral area(μm) | Central region diameter/tissue long diameter(%) | Mean gray value-BG ratio, non-central region/central region | Average | 95%C.I. |
|---|---|---|---|---|---|---|---|---|
| Without | 14 days | 2w_s_1 | 1.62303 | 387.6 | 76.1% | 0.786318 | 0.97411 | 0.114612 |
| | | 2w_s_2 | 2.190394 | 461.1 | 78.9% | 0.898059 | | |
| | | 2w_s_3 | 2.361946 | 481.3 | 79.6% | 0.986051 | | |
| | | 2w_s_4 | 2.775369 | 340.5 | 87.7% | 1.135614 | | |
| | | 2w_s_5 | 2.731803 | 325.7 | 88.1% | 1.009215 | | |
| | | 2w_s_6 | 2.693483 | 307.5 | 88.6% | 1.029405 | | |
| With | 14 days | 2w_r_1 | 1.191995 | 635.1 | 46.7% | 1.84092 | 1.49825 | 0.289629 |
| | | 2w_r_2 | 1.755049 | 469.6 | 73.2% | 1.195853 | | |
| | | 2w_r_3 | 2.35936 | 935.5 | 60.4% | 1.90518 | | |
| | | 2w_r_4 | 2.236505 | 428.5 | 80.8% | 1.33924 | | |
| | | 2w_r_5 | 3.778238 | 222.1 | 94.1% | 1.442842 | | |
| | | 2w_r_6 | 4.601387 | 748.7 | 83.7% | 1.265459 | | |
| Without | 28 days | 4w_s_1 | 1.480296 | 246.2 | 83.4% | 0.763828 | 0.901042 | 0.122323 |
| | | 4w_s_2 | 1.950123 | 353.0 | 81.9% | 0.809883 | | |
| | | 4w_s_3 | 2.001108 | 502.7 | 74.9% | 0.85189 | | |
| | | 4w_s_4 | 2.732512 | 750.5 | 72.5% | 1.045046 | | |
| | | 4w_s_5 | 3.385795 | 517.8 | 84.7% | 1.073428 | | |
| | | 4w_s_6 | 5.385263 | 447.6 | 91.7% | 0.862174 | | |
| With | 28 days | 4w_r_1 | 2.06601 | 715.1 | 65.4% | 1.5937 | 1.409267 | 0.179469 |
| | | 4w_r_2 | 2.113177 | 661.0 | 68.7% | 1.30469 | | |
| | | 4w_r_3 | 3.166753 | 524.4 | 83.4% | 1.33231 | | |
| | | 4w_r_4 | 3.554658 | 445.3 | 87.5% | 1.40637 | | |

LUBRICIN-LOCALIZED CARTILAGE-LIKE TISSUE, METHOD FOR PRODUCING SAME AND COMPOSITION COMPRISING SAME FOR TREATING ARTICULAR CARTILAGE DAMAGE

FIELD

The present invention relates to lubricin localized cartilage-like tissue and to a method for its production. The invention further relates to a composition for treatment of articular cartilage injury containing the lubricin localized cartilage-like tissue.

BACKGROUND

Cartilage tissue is formed of chondrocytes and a specific extracellular matrix that lacks type I collagen but contains type II collagen, type IX collagen, type XI collagen and proteoglycans. Since cartilage tissue that has been lost by joint injury does not heal naturally, it undergoes deterioration unless restorative treatment such as grafting is done. However, cartilage tissue must first be obtained in order to perform grafting to a site of injury, and since using cartilage from a different part of the patient causes loss of cartilage tissue at that part, there is a limit to the size of an injury that can be dealt with by transplantation therapy. Methods of using amplified culturing of harvested chondrocytes for grafting are therefore employed, but in vitro culturing results in fibrosis of the chondrocytes and an inadequate therapeutic effect (NPL 1). Methods of administering mesenchymal stem cells have also been proposed, but because mesenchymal stem cells differentiate into many different types of cells, the repaired portion of the site of loss comprises not only the desired chondrocytes but also fibrous tissue which expresses type I collagen and hypertrophic tissue which expresses type X collagen (NPL 2).

In light of this situation, methods have come to be proposed in recent years in which chondrocytes are induced from pluripotent stem cells such as iPS cells or ES cells (PTL 1, for example), and attempts have been made to use these for regeneration of lost cartilage tissue.

CITATION LIST

Patent Literature

[PTL 1] WO2016/133208

Non Patent Literature

[NPL 1] Roberts, S., et al. Knee 16, 398-404(2009).
[NPL 2] Mithoefer, K., et al. Am. J. Sports Med. 37, 2053-2063.

SUMMARY

Technical Problem

It is an object of the present invention to provide lubricin-localized cartilage-like tissue having high cartilage regeneration ability, which is capable of rapidly regenerating to normal cartilage tissue when grafted into a human, as well as a composition for treatment of articular cartilage injury that contains the tissue.

Solution to Problem

The present inventors have avidly studied means of achieving the aforestated object, and as a result we have found that it is possible to stably produce cartilage-like tissue in which lubricin is localized at the superficial zone periphery, by subjecting cartilage-like tissue induced from pluripotent stem cells to mechanical stimulation in a medium. The present invention have been completed on the basis of this finding.

Specifically, the invention has the following features:

[1] Lubricin localized cartilage-like tissue, wherein:
in an arbitrary cross-section running through: a first center of gravity of the cartilage-like tissue that has been induced from pluripotent stem cells; or a center of gravity region which is the region inside of a concentric sphere centered on the first center of gravity and having a diameter that is the maximum diameter of the cartilage-like tissue induced from the pluripotent stem cells (first maximum diameter)×0.2,
the ratio of the lubricin expression level per unit area contained in the central region which is the region inside of a concentric circle centered on a second center of gravity as the center of gravity of the cross-section and having a diameter that is the maximum diameter of the cross-section (second maximum diameter)×0.4 to 0.9 (the central lubricin level), and the lubricin expression level per unit area contained in the non-central region outside of the central region (the non-central lubricin level) is:
non-central lubricin level/central lubricin level>1, and the lubricin is thus localized.

[2] The lubricin localized cartilage-like tissue according to [1], wherein the non-central lubricin level/central lubricin level ratio is greater than 1.3.

[3] The lubricin localized cartilage-like tissue according to [1] or [2], wherein the non-central lubricin level/central lubricin level ratio is greater than 1.5.

[4] The lubricin localized cartilage-like tissue according to any one of [1] to [3], which exhibits uniform positivity for the portions other than the adventitia in Safranin O staining.

[5] The lubricin localized cartilage-like tissue according to any one of [1] to [4], wherein lubricin is expressed in at least 70% of the area of the entire periphery of the cross-section.

[6] The lubricin localized cartilage-like tissue according to any one of [1] to [5], which is approximately spherical.

[7] The lubricin localized cartilage-like tissue according to any one of [1] to [6], wherein the pluripotent stem cells are ES cells, ntES cells or iPS cells.

[8] The lubricin localized cartilage-like tissue according to any one of [1] to [7], wherein the non-central region includes a Safranin O-positive portion.

[9] Lubricin localized cartilage-like tissue, wherein:
the ratio of the lubricin expression level per unit weight contained in the superficial zone periphery of the cartilage-like tissue induced from pluripotent stem cells (the superficial zone lubricin level), and the lubricin expression level per unit weight contained in the non-superficial zone periphery (non-superficial zone lubricin level) is: superficial zone lubricin level/non-superficial zone lubricin level>1.3,
when, in the distance from an arbitrary point on the surface of the cartilage-like tissue (first point) to the first center of gravity, the point at a distance of 5% to 60% from a first point is defined as a second point, the superficial zone periphery is the region outside of the set of second points for any first points, and the non-superficial zone periphery is the region of cartilage-like tissue excluding the superficial zone periphery, present on the inside of the superficial zone periphery.

[10] The lubricin localized cartilage-like tissue according to [9], wherein the superficial zone lubricin level/non-superficial zone lubricin level is greater than 1.5.

[11] The lubricin localized cartilage-like tissue according to [9] or [10], which exhibits uniform positivity for the portions other than the adventitia in Safranin O staining.

[12] The lubricin localized cartilage-like tissue according to any one of [9] to [11], wherein lubricin is expressed in at least 70% of the area of the surface.

[13] The lubricin localized cartilage-like tissue according to any one of [9] to [12], which is approximately spherical.

[14] The lubricin localized cartilage-like tissue according to any one of [9] to [13], wherein the pluripotent stem cells are ES cells, ntES cells or iPS cells.

[15] The lubricin localized cartilage-like tissue according to any one of [9] to [14], wherein the superficial zone periphery does not include a Safranin O-positive portion.

[16] The lubricin localized cartilage-like tissue according to any one of [9] to [15], wherein the superficial zone periphery includes a Safranin O-positive portion.

[17] Lubricin localized cartilage-like tissue, wherein:
the ratio of the lubricin expression level per unit weight contained in the superficial zone periphery of the cartilage-like tissue induced from pluripotent stem cells (the superficial zone lubricin level), and the lubricin expression level per unit weight contained in the non-superficial zone periphery (non-superficial zone lubricin level) is: superficial zone lubricin level/non-superficial zone lubricin level>1.3,
when, in the distance from an arbitrary point on the surface of the cartilage-like tissue (first point) to the first center of gravity, a point at a distance of 500 μm from the first point is defined as a second point, the superficial zone periphery is the region outside of the set of second points for any first points, and
the non-superficial zone periphery is the region of cartilage-like tissue excluding the superficial zone periphery, present on the inside of the superficial zone periphery.

[18] The lubricin localized cartilage-like tissue according to [17], wherein the superficial zone lubricin level/non-superficial zone lubricin level is greater than 1.5.

[19] The lubricin localized cartilage-like tissue according to any one of [17] or [18], which exhibits uniform positivity for the portions other than the membranous structure in Safranin O staining.

[20] The lubricin localized cartilage-like tissue according to any one of [17] to [19], wherein lubricin is expressed in at least 70% of the area of the surface.

[21] The lubricin localized cartilage-like tissue according to any one of [17] to [20], which is approximately spherical.

[22] The lubricin localized cartilage-like tissue according to any one of [17] to [21], wherein the maximum diameter is 1 mm to 6 mm.

[23] The lubricin localized cartilage-like tissue according to any one of [17] to [22], wherein the pluripotent stem cells are ES cells, ntES cells or iPS cells.

[24] The lubricin localized cartilage-like tissue according to any one of [17] to [23], wherein the superficial zone periphery does not include a Safranin O-positive portion.

[25] The lubricin localized cartilage-like tissue according to any one of [17] to [24], wherein the superficial zone periphery includes a Safranin O-positive portion.

[26] A method for producing the lubricin localized cartilage-like tissue according to any one of [1] to [25], which includes a step of subjecting cartilage-like tissue induced from pluripotent stem cells to mechanical stimulation in a medium, causing localization of lubricin.

[27] The method according to [26], wherein the pluripotent stem cells are ES cells, ntES cells or iPS cells.

[28] The method according to [26] or [27], wherein the mechanical stimulation is shear force.

[29] The method according to [29], wherein the shear force is applied from all directions of the outer periphery of the tissue.

[30] The method according to [29] or [30], wherein the shear force is applied by stirring means.

[31] The method according to [31], wherein the stirring means is a stirred bioreactor.

[32] The method according to [31], wherein the stirred bioreactor is a stirred bioreactor having one or more stirring blades.

[33] The method according to [32], wherein the shear force includes shear force produced by contacting the cartilage-like tissue induced from pluripotent stem cells with the stirring blade and/or the bottom face and inner wall surface of a culture vessel in the stirred bioreactor.

[34] The method according to [32] or [33], wherein the stirring speed of the stirred bioreactor is 10 to 95 rpm.

[35] The method according to [32] or [33], wherein the stirring speed of the stirred bioreactor is 50 to 70 rpm.

[36] The method according to any one of [26] to [35], wherein the time period for the step is at least 3 days.

[37] The method according to any one of [26] to [35], wherein the time period for the step is at least 14 days.

[38] The method according to any one of [26] to [35], wherein the time period for the step is at least 28 days.

[39] The method according to any one of [26] to [38], wherein the amount of cartilage-like tissue induced from pluripotent stem cells used in the step is less than or equal to 100 mg per 30 mL of medium.

[40] The method according to any one of [26] to [38], wherein the amount of cartilage-like tissue induced from pluripotent stem cells used in the step is 60 mg/30 mL medium or less.

[41] The method according to any one of [26] to [40], wherein the medium includes TGFβ, BMP2 and GDF5.

[42] The method according to any one of [26] to [41], wherein the medium includes serum.

[43] The method according to any one of [26] to [42], wherein the medium includes HMG-CoA reductase inhibitor.

[44] The method according to [43], wherein the HMG-CoA reductase inhibitor is rosuvastatin.

[45] The method according to any one of [26] to [44], wherein the PRG4 expression level of the lubricin localized cartilage-like tissue after the step increases to at least 3 times that of the cartilage-like tissue induced from pluripotent stem cells before the step.

[46] Lubricin localized cartilage-like tissue obtained by the method according to any one of [26] to [45].

[47] A composition for treatment of articular cartilage injury, comprising lubricin localized cartilage-like tissue according to any one of [1] to [25] and [46].

Advantageous Effects of Invention

According to the invention it has become possible to provide cartilage-like tissue with localized lubricin. The lubricin-localized cartilage-like cells provided by the invention can be used for cartilage regenerative medicine.

BRIEF DESCRIPTION OF DRAWINGS

FIG. 3B shows Safranin O immunostained images of cartilage-like tissue sections.

FIG. 4 shows the results of quantifying the lubricin immunostained image of FIG. 3A. (A) shows the results of quantifying lubricin immunostained images for different samples. (B) shows the mean gray value-background ratio of the peripheral region and the central region shown in (A), in graph form.

FIG. 5A shows lubricin immunostained images of cartilage-like tissue sections.

FIG. 6A shows the results of quantifying the lubricin immunostained image of FIG. 5A (day 0 and day 7). The superficial zone peripheral area was calculated from the tissue long diameter (mm) and (100−central region diameter/tissue long diameter) %.

FIG. 6B shows the results of quantifying the lubricin immunostained image of FIG. 5A (day 14 and day 28). The superficial zone peripheral area was calculated from the tissue long diameter (mm) and (100−central region diameter/tissue long diameter) %.

DESCRIPTION OF EMBODIMENTS

Figure 1:
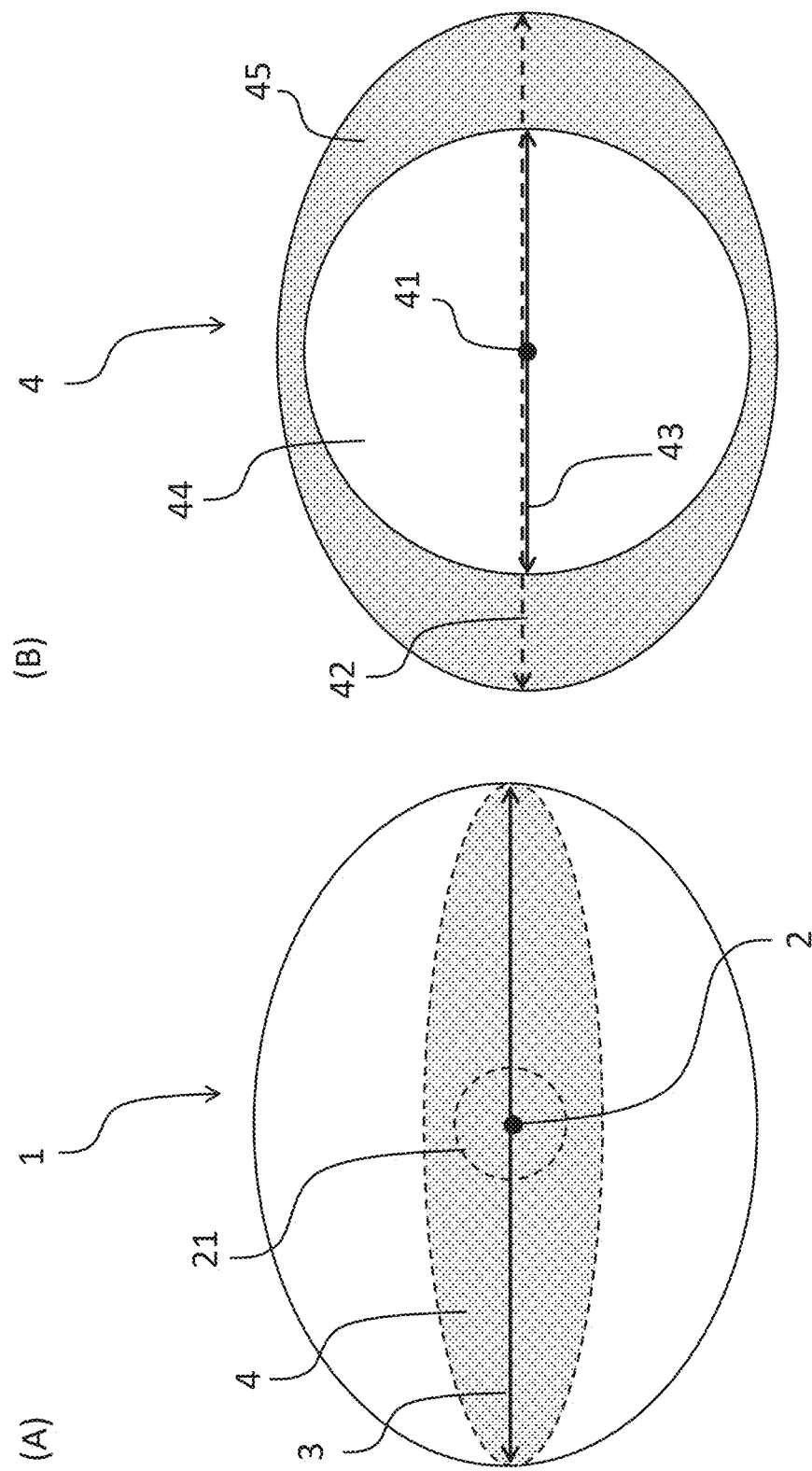
FIG. 1 is a schematic diagram showing cartilage-like tissue. (A) is an outer schematic view of the cartilage-like tissue. (B) is a schematic view of cross-section 4 of (A).

The present invention will be described in detail below, with the implicit understanding that the technical scope of the invention is not limited only to these embodiments.

The terms "first, "second" and "third" throughout the present specification are used to distinguish one element from another, and a first element may be referred to as "second element", or similarly a second element may be referred to as "first element", without deviating from the gist of the invention.

Unless otherwise defined, the terms (technical and scientific terms) used herein have the same meanings as generally understood by those skilled in the art.

According to one embodiment, the invention provides lubricin localized cartilage-like tissue wherein:
in an arbitrary cross-section running through: a first center of gravity of the cartilage-like tissue induced from pluripotent stem cells; or a center of gravity region which is the region inside of a concentric sphere centered on the first center of gravity and having a diameter that is the maximum diameter of the cartilage-like tissue induced from the pluripotent stem cells (first maximum diameter)×0.2,
the ratio of the lubricin expression level per unit area contained in the central region which is the region inside of a concentric circle centered on a second center of gravity as the center of gravity of the cross-section and having a diameter that is the maximum diameter of the cross-section (second maximum diameter)×0.4 to 0.9 (the central lubricin level), and the lubricin expression level per unit area contained in the non-central region outside of the central region (the non-central lubricin level) is:
non-central lubricin level/central lubricin level>1, and the lubricin is thus localized.

Throughout the present specification, "cartilage-like tissue" refers to tissue containing chondrocytes that have been induced to differentiate from pluripotent stem cells and mimicking cartilage tissue present in the body, and it is composed of membranous structure and the contents incorporated in the membranous structure, the membranous structure containing COL1 fibers but not COL2 fibers, and the contents including Col11 fibers, Col2 fibers, proteoglycans and chondrocytes. Throughout the present specification, "membranous structure" refers to the Safranin O-negative superficial zone part appearing when the cartilage-like tissue is stained with Safranin O. Also throughout the present specification, "cartilage-like tissue" refers to tissue exhibiting uniformly positive in the portions other than the membranous structure upon staining of Safranin O, and exhibiting positivity in the center section excluding the membranous structure upon immunostaining of type 2 collagen. The "cartilage-like tissue" referred to herein has uniform distribution of glycosaminoglycans and type 2 collagen. The "cartilage-like tissue" referred to herein therefore has high dynamic strength. Such "cartilage-like tissue" may be tissue with a glycosaminoglycan content of 10% or greater, preferably 15% or greater and more preferably 20% or greater, by dry weight. Throughout the present specification, "COL1 fibers" are fibers in which protein encoded by the COL1 gene forms a triple helical structure. Similarly, "COL2 fibers" are fibers in which protein encoded by the COL2 gene forms a triple helical structure. Likewise, "COL11 fibers" are fibers in which protein encoded by the COL11 gene forms a triple helical structure. A "proteoglycan" referred to throughout the present specification is a compound in which serine as an amino acid in the core protein bonds with sugars (xylose, galactose or glucuronic acid), the sugars being polysaccharides with continuous disaccharide units such as chondroitin sulfate.

Throughout the present specification, "chondrocytes" means cells that produce the extracellular matrix composing the cartilage, such as collagen, or their progenitor cells. Chondrocytes may be cells expressing chondrocyte markers, examples of chondrocyte markers being type II collagen (COL2A1) and SOX9. Examples for COL2A1 include, but are not limited to, a gene having the nucleotide sequence identified by the NCBI Accession No. NM_001844 or NM_033150 for humans, or NM_001113515 or NM_031163 for mice, or a protein encoded by the gene, or a naturally occurring mutant having the same function. Examples for SOX9 include, but are not limited to, a gene having the nucleotide sequence identified by the NCBI Accession No. NM_000346 for humans, or NM_011448 for mice, or a protein encoded by the gene, or a naturally occurring mutant having the same function.

The lubricin localized cartilage-like tissue provided by the invention may be produced as a cell population including chondrocytes as well as other cell types, examples of which include cell populations consisting of ≥70%, ≥80%, ≥90%, ≥95% or ≥98% chondrocytes.

The lubricin localized cartilage-like tissue to be provided by the invention has lubricin protein (also referred to simply as "lubricin") localized more in the non-central region (also referred to as "superficial zone periphery") than in the central region (also referred to as "non-superficial zone periphery"). The non-central region (superficial zone periphery) may be composed entirely of the Safranin O-negative membranous structure, or it may include the Safranin O-negative membranous structure and Safranin O-positive portions inside the membranous structure. The non-central region of the lubricin localized cartilage-like tissue provided by the invention not only contains lubricin-positive cells, but also has lubricin in the extracellular matrix. Lubricin is a protein encoded by the proteoglycan 4 (prg4) gene, being also known by the alternate names PRG4 protein, megakaryocyte-stimulating factor (MSF) and superficial zone protein (SZP), as a ubiquitous endogenous glycoprotein covering the surfaces of body joints (see NCBI deposit number AK131434-U70136, for example). Lubricin is a molecule that acts primarily as a cell-protective, anti-adhesive boundary lubricant, with high surface activity (for water retention, for example). The molecule has a long central mucin-like domain located between the terminal protein domains, allowing the molecule to adhere to tissue surfaces and play a role in surface protection.

After conducting much research, the present inventors have found a method that localizes lubricin more in the non-central regions than in the central region of cartilage-like tissue induced from pluripotent stem cells, i.e. in the superficial zone periphery of the cartilage-like tissue. The cartilage-like tissue of the invention has higher dynamic strength when grafted into humans than conventional cartilage-like tissue, and rapidly regenerates to normal cartilage tissue with lubricin localized in the superficial zone, or in other words, it has high cartilage regeneration ability.

Throughout the present specification, "first center of gravity 2" refers to the site of action of the resultant force of universal gravitation (gravity) acting on any cartilage-like tissue 1, and it is shown as first center of gravity 2 in FIG. 1, for example. Also throughout the present specification, the "center of gravity region 21" is defined as the region inside a concentric sphere having a diameter that, given a maximum diameter (first maximum diameter 3) running through the first center of gravity 2 of the cartilage-like tissue 1, is the first maximum diameter centered on the first center of gravity 2×0.2, and preferably the first maximum diameter×0.1. The term "cross-section 4", as used herein, is defined as any cross-section 4 of the cartilage-like tissue 1 running through the first center of gravity 2 or the center of gravity region 21 (preferably a cross-section 4 present on the same plane). Here, "same plane" is synonymous with a cross-section which is a tissue section prepared by a method known to those skilled in the art, and it should not be considered to be the "same plane" in the strict sense.

The term "second center of gravity 41" used herein means the center of gravity of the cross-section 4 mentioned above.

Throughout the present specification, "central region 44" is defined as the region inside a concentric circle which is centered on the second center of gravity 41 and given the maximum diameter of a cross-section 4 running through the second center of gravity 41 (second maximum diameter 42), has a diameter of the second maximum diameter 42×0.4 to 0.9 (also to be referred to as "central region diameter 43"). The central region diameter 43 may be the second maximum diameter 42×0.4 to 0.9, the second maximum diameter 42×0.6 to 0.9, the second maximum diameter 42×0.7 to 0.9, the second maximum diameter 42×0.8 to 0.9, the second maximum diameter 42×0.9, the second maximum diameter 42×0.4 to 0.8, the second maximum diameter 42×0.6 to 0.8, the second maximum diameter 42×0.7 to 0.8, the second maximum diameter 42×0.8, the second maximum diameter 42×0.4 to 0.7, the second maximum diameter 42×0.6 to 0.7 or the second maximum diameter 42×0.7.

Throughout the present specification, the "non-central region 45" (also referred to as "peripheral region") is the region of the cross-section 4 with the central region 44 excluded.

In the cartilage-like tissue 1 provided by the invention, the ratio of the lubricin expression level per unit area in the central region 44 (also referred to as "central lubricin level") and the lubricin expression level per unit area in the non-central region 45 (also referred to as "non-central lubricin level") is non-central lubricin level/central lubricin level>1, preferably non-central lubricin level/central lubricin level>1.1, more preferably non-central lubricin level/central lubricin level 1.2, non-central lubricin level/central lubricin level>1.3 or non-central lubricin level/central lubricin level>1.4, and even more preferably non-central lubricin level/central lubricin level>1.5, so that lubricin is localized in the non-central region 45. Since lubricin is localized in the non-central region 45, i.e. the superficial zone periphery of the cartilage-like tissue 1, it becomes possible to provide cartilage-like tissue 1 capable of rapid regeneration to normal cartilage tissue with lubricin localized in the superficial zone, i.e. with high cartilage regeneration capability, when grafted into a human.

The upper limit for the non-central lubricin level/central lubricin level value of the cartilage-like tissue 1 provided by the invention is not particularly restricted but is preferably non-central lubricin level/central lubricin level<20, such as non-central lubricin level/central lubricin level<10.

From the viewpoint of allowing rapid regeneration to normal cartilage having lubricin localized in the superficial zone after grafting even when all of the sides are located on the superficial zone during grafting, the cartilage-like tissue 1 provided by the invention expresses lubricin preferably in an area of at least 50%, more preferably at least 70%, even more preferably at least 80% and most preferably at least 90% of the entire outer periphery of the cross-section 4.

The cartilage-like tissue 1 provided by the invention may have any shape, but it is preferably a shape other than cylindrical, and from the viewpoint of filling different shapes without loss upon grafting, it is most preferred to be approximately spherical. The term "approximately spherical" as used herein also includes nearly spherical shapes other than truly spherical. The cross-section of the approximately spherical body for the purpose of the invention may be a distorted circle (such as elliptical or rugby ball-shaped) or a distorted polygon (such as hexagonal or greater), instead of a concentric circle or concentric polygon.

For the purpose of the invention, the central region 44 and non-central region 45 were defined as above for convenience in order to describe the state of lubricin being localized in the superficial zone periphery of the cartilage-like tissue 1 ("first description method"), but the state of lubricin being localized in the superficial zone periphery of the cartilage-like tissue 1 can be described in the following manner ("second description method"). For example, if, along the distance from an arbitrary point (first point) on the surface of the cartilage-like tissue 1 to the first center of gravity 2, a point at a distance of 5% to 60%, 10% to 60%, 10% to 40%, 10% to 30%, 20 to 60%, 20 to 40% or 20 to 30% from the first point is defined as a second point, then the region outside of a set of second points for any first points can be defined as the "superficial zone periphery", and the region of the cartilage-like tissue 1 excluding the superficial zone periphery, which is present on the inside of the superficial zone periphery, can be defined as the "non-superficial zone periphery" (not shown). In this case, it can be stated that in the cartilage-like tissue 1 provided by the invention, the ratio of the lubricin expression level per unit weight in the superficial zone periphery (also referred to as "superficial zone lubricin level") and the lubricin expression level per unit weight in the non-superficial zone periphery (also referred to as "non-superficial zone lubricin level") is: superficial zone lubricin level/non-superficial zone lubricin level>1, preferably superficial zone lubricin level/non-superficial zone lubricin level>1.3 and more preferably superficial zone lubricin level/non-superficial zone lubricin level>1.5, indicating that lubricin is localized in the superficial zone periphery.

The state of lubricin being localized in the superficial zone periphery of the cartilage-like tissue 1 can also be described in the following manner ("third description method"). For example, if, along the distance from an arbitrary point (first point) on the surface of the cartilage-like tissue 1 to the first center of gravity 2, a point at a distance of 100 to 1600 µm, 100 to 1000 µm, 200 to 800 µm, 300 to 700 µm, 400 to 600 µm or 500 µm from the first point is defined as a second point, then the region outside of a set of second points for any first points can be defined as the "superficial zone periphery", and the region of the cartilage-like tissue 1 excluding the superficial zone periphery, which is present on the inside of the superficial zone periphery, can be defined as the "non-superficial zone periphery" (not shown). In this case, it can be stated that in the cartilage-like tissue 1 provided by the invention, the ratio of the lubricin expression level per unit weight in the superficial zone periphery (also referred to as "superficial zone lubricin level") and the lubricin expression level per unit weight in the non-superficial zone periphery (also referred to as "non-superficial zone lubricin level") is: superficial zone lubricin level/non-superficial zone lubricin level>1, preferably superficial zone lubricin level/non-superficial zone lubricin level>1.3 and more preferably superficial zone lubricin level/non-superficial zone lubricin level>1.5, indicating that lubricin is localized in the superficial zone periphery.

The first and second description methods are merely examples for describing the present invention, and a person skilled in the art will recognize that cartilage-like tissue described in a different way from these methods is also encompassed within the scope of the invention.

According to the invention, the lubricin expression level can be measured by any known method. For example, it can be evaluated by measurement using image analysis with an image obtained by an immunohistochemical staining method using anti-lubricin antibody, or quantitation by Western blotting or ELISA, or measurement of the expression level of lubricin mRNA, such as PRG4 mRNA, by quantitative PCR, or any other method.

The present invention provides a method for producing lubricin localized cartilage-like tissue that includes a step of subjecting cartilage-like tissue induced from pluripotent stem cells to mechanical stimulation in a medium, causing localization of lubricin.

According to the invention, the cartilage-like tissue induced from pluripotent stem cells before localization of lubricin may be cartilage-like tissue obtained by inducing differentiation using a publicly known method, and it can be prepared by the method described in WO2016/133208, for example. WO 2016/133208 is incorporated herein by reference. The following is an example of such a method.

(i) Cartilage-like tissue induced from pluripotent stem cells is prepared by a method including (i) a step of adhesion culturing of pluripotent stem cells in medium containing one or more substances selected from the group consisting of BMP2, TGFβ and GDF5, with HMG-CoA reductase inhibitor, and (ii) a step of suspension culturing of the cells obtained in step (i) in medium containing one or more substances selected from the group consisting of BMP2, TGFβ and GDF5, with HMG-CoA reductase inhibitor.

Pluripotent stem cells to be used for the invention may be stem cells capable of differentiating to chondrocytes and are not otherwise restricted, with examples including embryonic stem (ES) cells, embryonic stem cells from cloned embryos obtained by nuclear transfer (ntES), germline stem cells ("GS cells"), embryonic germ cells ("EG cells"), induced pluripotent stem cells (iPS cells), pluripotent cells derived from cultured fibroblasts or bone marrow stem cells (Muse cells), and mesenchymal stem cells. Preferred pluripotent stem cells are ES cells, ntES cells and iPS cells.

(A) Embryonic Stem Cells

ES cells are stem cells having pluripotency and auto-replicating proliferation potency, established from the inner cell mass of an early embryo (such as the blastocyst) of a mammal such as a human or mouse.

ES cells are embryonic stem cells derived from the inner cell mass of the blastocyst, which is the embryo after the 8-cell stage and morula stage of a fertilized egg, having the ability to differentiate into the various types of cells of the body, i.e. pluripotency, and self-renewal proliferation potency. ES cells were discovered in mice in 1981 (M. J. Evans and M. H. Kaufman (1981), Nature 292:154-156), and ES cell lines were later established in primates including humans and monkeys (J. A. Thomson et al. (1998), Science 282:1145-1147; J. A. Thomson et al. (1995), Proc. Natl. Acad. Sci. USA, 92:7844-7848; J. A. Thomson et al. (1996), Biol. Reprod., 55:254-259; J. A. Thomson and V. S. Marshall (1998), Curr. Top. Dev. Biol., 38:133-165).

ES cells can be established by extracting the inner cell mass from the blastocyst of a fertilized egg of an animal and culturing the inner cell mass on a fibroblast feeder. Maintenance of the cells by subculturing can be carried out using medium with addition of a substance such as leukemia inhibitory factor (LIF) or basic fibroblast growth factor (bFGF). Methods for establishing and maintaining human and monkey ES cells are described in U.S. Pat. No. 5,843,780; Thomson J A, et al. (1995), Proc. Natl. Acad. Sci. USA, 92:7844-7848; Thomson J A, et al. (1998), Science 282: 1145-1147; H. Suemori et al. (2006), Biochem. Biophys. Res. Commun., 345:926-932; M. Ueno et al. (2006), Proc. Natl. Acad. Sci. USA, 103:9554-9559; H. Suemori et al. (2001), Dev. Dyn., 222:273-279; H. Kawasaki et al. (2002), Proc. Natl. Acad. Sci. USA, 99:1580-1585; Klimanskaya I, et al. (2006) and Nature 444:481-485, for example.

Human ES cells can be maintained using medium for preparation of ES cells, such as DMEM/F-12 medium supplemented with 0.1 mM 2-mercaptoethanol, 0.1 mM non-essential amino acids, 2 mM L-glutamine, 20% KSR and 4 ng/ml bFGF, in a moist atmosphere of 2% $CO_2$/98% air at 37° C., for example (O. Fumitaka et al. (2008), Nat. Biotechnol., 26:215-224). ES cells must be subcultured every 3 to 4 days, during which time subculturing may be carried out using 0.25% trypsin and 0.1 mg/ml collagenase IV in PBS containing 1 mM $CaCl_2$ and 20% KSR.

Selection of the ES cells can generally be carried out by Real-Time PCR with expression of gene markers such as alkaline phosphatase, Oct-3/4 and Nanog as indicators. Expression of gene markers such as OCT-3/4, NANOG and ECAD can also be used as an indicator for selection of the human ES cells (E. Kroon et al. (2008), Nat. Biotechnol., 26:443-452).

As human ES cell lines, WA01(H1) and WA09(H9) can be obtained from WiCell Research Institute, and KhES-1, KhES-2 and KhES-3 can be obtained from Institute for Frontier Life and Medical Sciences, Kyoto University (Kyoto, Japan).

(B) Germline Stem Cells

Germline stem cells are pluripotent stem cells derived from the testes, and they serve as a source for spermatogenesis. Similar to ES cells, these cells can also be induced to differentiate to cells of various cell series, and have properties that allow creation of a chimeric mouse when they are grafted into a mouse blastocyst, for example (M. Kanatsu-Shinohara et al. (2003) Biol. Reprod., 69:612-616; K. Shinohara et al. (2004), Cell, 119:1001-1012). They are also capable of auto-replication in medium containing glial cell line-derived neurotrophic factor (GDNF), and their repeated subculturing under culturing conditions similar to those of ES cells allows germline stem cells to be obtained (Takebayashi, M. et al. (2008), Jikken Igaku, Vol. 26, No. 5 (Special Edition) pp. 41-46, Yodosha (Tokyo, Japan).

(C) Embryonic Germ Cells

Embryonic germ cells are cells with pluripotency similar to ES cells, being established from primordial germ cells at the embryonic stage, and they can be established by culturing primordial germ cells in the presence of substances such as LIP, bFGF and stem cell factors (Y. Matsui et al. (1992), Cell, 70:841-847; J. L. Resnick et al. (1992), Nature, 359: 550-551).

(D) Induced Pluripotent Stem Cells

Induced pluripotent stem (iPS) cells are artificial stem cells derived from somatic cells, having properties almost equivalent to those of ES cells, such as pluripotency and self-renewal proliferation potency, and they can be created by introducing specific reprogramming factors in the form of DNA or protein into somatic cells (K. Takahashi and S. Yamanaka (2006), Cell, 126:663-676; K. Takahashi et al. (2007), Cell, 131:861-872; J. Yu et al. (2007), Science, 318:1917-1920; Nakagawa, M. et al., Nat. Biotechnol. 26:101-106(2008); International Patent Publication WO2007/069666). Reprogramming factors may consist of genes specifically expressed in ES cells, or those gene products or non-coding RNA, or genes that play important roles in maintaining non-differentiation of ES cells, or their gene products or non-coding RNA or low molecular compounds. Examples of genes among reprogramming factors include Oct3/4, Sox2, Sox1, Sox3, Sox15, Sox17, Klf4, Klf2, c-Myc, N-Myc, L-Myc, Nanog, Lin28, Fbx15, ERas, ECAT15-2, Tcl1, beta-catenin, Lin28b, Sall1, Sall4, Esrrb, Nr5a2, Tbx3 and Glis1, any one of which reprogramming factors may be used alone or in combinations. Examples of combinations of reprogramming factors include those described in WO2007/069666, WO2008/118820, WO2009/007852, WO2009/032194, WO2009/058413, WO2009/057831, WO2009/075119, WO2009/079007, WO2009/091659, WO2009/101084, WO2009/101407, WO2009/102983, WO2009/114949, WO2009/117439, WO2009/126250, WO2009/126251, WO2009/126655, WO2009/157593, WO2010/009015, WO2010/033906, WO2010/033920, WO2010/042800, WO2010/050626, WO2010/056831, WO2010/068955, WO2010/098419, WO2010/102267, WO2010/111409, WO2010/111422, WO2010/115050, WO2010/124290, WO2010/147395, WO2010/147612, Huangfu D, et al. (2008), Nat. Biotechnol., 26:795-797, Shi Y, et al. (2008), Cell Stem Cell, 2:525-528, Eminli S, et al. (2008), Stem Cells. 26:2467-2474, Huangfu D, et al. (2008), Nat. Biotechnol. 26:1269-1275, Shi Y, et al. (2008), Cell Stem Cell, 3, 568-574, Zhao Y, et al. (2008), Cell Stem Cell, 3:475-479, Marson A. (2008), Cell Stem Cell, 3, 132-135, Feng B, et al (2009), Nat Cell Biol. 11:197-203, R. L. Judson et al., (2009), Nat. Biotech., 27:459-461, Lyssiotis C A, et al. (2009), Proc. Natl. Acad. Sci. USA. 106:8912-8917, Kim J B, et al. (2009), Nature 461:649-643, Ichida J K, et al. (2009), Cell Stem Cell. 5:491-503, Heng J C, et al. (2010), Cell Stem Cell. 6:167-74, Han J, et al. (2010), Nature 463:1096-100, Mali P, et al. (2010), Stem Cells. 28:713-720, Maekawa M, et al. (2011) and Nature 474:225-9.

Reprogramming factors also include factors used to increase establishment efficiency, such as histone deacetylase (HDAC) inhibitor [for example, low molecular inhibitors such as valproic acid (VPA), tricostatin A, sodium butyrate, MC1293, M344, or nucleic acid expression inhibitor including siRNA and shRNA for HDAC (such as HDAC1 siRNA Smartpool (Millipore), HuSH 29mer shRNA Constructs against HDAC1 (OriGene)], MEK inhibitors (such as PD184352, PD98059, U0126, SL327 and PD0325901), Glycogen synthase kinase-3 inhibitors (such as Bio and CHIR99021), DNA methyltransferase inhibitors (such as 5-azacytidine), histone methyltransferase inhibitors (including low molecular inhibitors such as BIX-01294, and nucleic acid expression inhibitors such as siRNA and shRNA for Suv39 hl, Suv39 h2, SetDB1 and G9a), L-channel calcium agonists (such as Bayk8644), butyric acid, TGFβ inhibitors or ALK5 inhibitors (such as LY364947, SB431542,616453 and A-83-01), p53 inhibitors (such as siRNA and shRNA for p53), ARID3A inhibitors (such as siRNA and shRNA for ARID3A), miRNA such as miR-291-3p, miR-294, miR-295 and mir-302, Wnt Signaling (such as soluble Wnt3a), neuropeptide Y, prostaglandins, (such as prostaglandin E2 and prostaglandin J2), and hTERT, SV40LT, UTF1, IRX6, GLIS1, PITX2 or DMRTB1, and for the purpose of the present specification, these factors used to improve establishment efficiency are not particularly distinguished from reprogramming factors.

When in the form of proteins, reprogramming factors can be introduced into somatic cells by methods such as lipofection, fusion with cell membrane-permeable peptides (such as HIV-derived TAT and polyarginine) or microinjection.

When in the form of DNA, it can be introduced into somatic cells by a method using a vector such as a virus, plasmid or artificial chromosome, or by lipofection, liposomes or microinjection. A viral vector may be a retrovirus vector, a lentivirus vector (Cell, 126, pp. 663-676, 2006; Cell, 131, pp. 861-872, 2007; Science, 318, pp. 1917-1920, 2007), an adenovirus vector (Science, 322, 945-949, 2008), an adeno-associated virus vector or a Sendai virus vector (WO2010/008054). Examples of artificial chromosome vectors include human artificial chromosome (HAC), yeast artificial chromosome (YAC) and bacterial artificial chromosomes (BAC, PAC). Plasmids to be used include mammalian cell plasmids (Science, 322:949-953, 2008). A vector may contain a control sequence such as a promoter, enhancer, ribosome-binding sequence, terminator or polyadenylated site to allow expression of the nuclear reprogramming substance, and if necessary it may also include a selective marker sequence such as a drug resistance gene (a kanamycin resistance gene, ampicillin resistance gene or puromycin resistance gene, for example), a thymidine kinase gene or a diphtheria toxin gene, or a reporter gene sequence such as green fluorescent protein (GFP), β-glucuronidase (GUS) or FLAG. The vector may also have the LoxP sequence before or after it, in order to cleave the gene coding for the reprogramming factor or a promoter with the gene coding for the reprogramming factor bonded to it, after its transfer into somatic cells.

When in the form of RNA, it may be introduced into somatic cells by a method such as lipofection or microinjection, and in order to reduce degradation, the RNA may incorporate 5-methylcytidine and pseudouridine (TriLink Biotechnologies) (Warren L, (2010), Cell Stem Cell. 7:618-630).

The medium for inducing iPS cells may be commercially available medium such as DMEM, DMEM/F12 or DME medium containing 10 to 15% FBS (such media further including LIF, penicillin/streptomycin, puromycin, L-glutamine, non-essential amino acids or β-mercaptoethanol as appropriate), or mouse ES cell culturing medium (TX-WES medium, Thrombo-X), primate ES cell culturing medium (Primate ES/iPS Cell Medium, ReproCell) or serum-free pluripotent stem cell maintenance medium (such as mTeSR (Stemcell Technology), Essential 8 (Life Technologies) or StemFit AK03 (Ajinomoto)).

The culturing method may comprise contacting the somatic cells and reprogramming factor on 10% FBS-containing DMEM or DMEM/F12 medium in the presence of 5% $CO_2$ at 37° C. and culturing for about 4 to 7 days, and then reseeding the cells onto feeder cells (such as mitomycin C-treated STO cells or SNL cells), culturing in bFGF-containing primate ES cell culturing medium from about 10 days after contact between the somatic cells and reprogramming factor, and producing iPS-like colonies at about 30-45 days after contact, or thereafter.

Alternatively, culturing may be carried out with 10% FBS-containing DMEM medium (also including LIF, penicillin/streptomycin, puromycin, L-glutamine, non-essential amino acids or β-mercaptoethanol as appropriate) on feeder cells (such as mitomycin C-treated STO cells or SNL cells) in the presence of 5% $CO_2$ at 37° C., to produce ES-like colonies from about 25-30 days or thereafter. Examples of preferred methods are the use of, instead of feeder cells, the somatic cells themselves that are to be reprogrammed (Takahashi K, et al. (2009), PLoS One. 4:e8067 or WO2010/137746), or an extracellular matrix (Laminin-5 (WO2009/123349) and Matrigel (BD Co.), for example).

A method of culturing using serum-free medium may also be used (Sun N, et al. (2009), Proc. Natl. Acad. Sci. USA, 106:15720-15725). For increased establishment efficiency, the iPS cells may be established under low oxygen conditions (an oxygen concentration of between 0.1% and 15%) (Yoshida Y, et al. (2009), Cell Stem Cell. 5:237-241 or WO2010/013845).

Exchange with fresh culture medium may be carried out once a day from day 2 of culturing onward during the culturing period. The somatic cell count for the cells used for nuclear reprogramming is not restricted and may be in the range of about $5×10^3$ to about $5×10^6$ cells per 100 $cm^2$ of culture dish.

The iPS cells can be selected based on the type of colonies formed. By introducing a marker gene which is a drug resistance gene that is expressed together with a gene expressed after reprogramming of somatic cells (such as Oct3/4 or Nanog), it is possible to select the established iPS cells by culturing in medium containing the corresponding drug (selective medium). Selection of the iPS cells is possible by observation under a fluorescent microscope when the marker gene is a fluorescent protein gene, by addition of a luminescent substrate when it is a luciferase gene, or by addition of a chromogenic substrate when it is a color-developing enzyme gene.

The terms "somatic cells" as used herein refers to any type of animal cells (preferably mammalian cells including those of humans) other than germline cells or totipotent cells such as ova, oocytes or ES cells. Somatic cells include fetal somatic cells, neonatal somatic cells, and mature healthy or diseased somatic cells, without being limitative, and also include primary cultured cells, subcultured cells and established cell lines. Specific examples of somatic cells include (1) tissue stem cells (somatic stem cells) such as neural stem cells, hematopoietic stem cells, mesenchymal stem cells and dental pulp stem cells, (2) tissue progenitor cells and (3) differentiated cells such as lymphocytes, epithelial cells, endothelial cells, muscle cells, fibroblasts (including skin cells), hair cells, hepatocytes, gastric mucosal cells, enterocytes, splenocytes, pancreatic cells (including exocrine pancreatic cells), brain cells, lung cells, renal cells and adipocytes.

When using iPS cells as material for grafting cells it is preferred to use somatic cells having the same or essentially the same HLA genotype as the recipient individual, from the viewpoint of avoiding rejection reaction. Here, "essentially the same" means that the HLA genotype matches to a degree that allows immunoreaction against the grafted cells to be reduced by immunosuppressive agents, and examples are somatic cells having an HLA type that matches at the 3 gene loci HLA-A, HLA-B and HLA-DR, or 4 gene loci further including HLA-C.

(E) ES Cells Derived from Clone Embryo Obtained by Nuclear Transfer ntES cells are ES cells derived from a clone embryo prepared by nuclear transfer, and they have approximately the same properties as fertilized egg-derived ES cells (T. Wakayama et al. (2001), Science, 292:740-743; S. Wakayama et al. (2005), Biol. Reprod., 72:932-936; J. Byrne et al. (2007), Nature, 450:497-502). In other words, ntES (nuclear transfer ES) cells are ES cells established from the inner cell mass of a clone embryo-derived blastocyst obtained by exchanging an unfertilized egg nucleus with a somatic cell nucleus. Combinations of nuclear transfer (J. B. Cibelli et al. (1998), Nature Biotechnol., 16:642-646) and ES cell preparation techniques (described above) are used to prepare ntES cells (Wakayama, S. (2008), Jikken Igaku, Vol. 26, No. 5 (special edition), pp. 47-52). For nuclear transfer, a somatic cell nucleus may be implanted into a mammalian enucleated unfertilized egg and cultured for several hours for reprogramming.

(F) Multilineage-Differentiating Stress Enduring Cells (Muse Cells)

Muse cells are pluripotent stem cells produced by the method described in WO2011/007900, and specifically they are pluripotent cells obtained by subjecting fibroblasts or marrow stromal cells to prolonged trypsin treatment, which is preferably trypsin treatment for 8 hours or 16 hours, and then suspension culturing them, resulting in SSEA-3- and CD105-positive cells.

(G) Mesenchymal Stem Cells

The term "mesenchymal stem cells" refers to undifferentiated cells that have the ability to differentiate into various types of mesenchymal cells such as adipocytes, chondrocytes, osteocytes, myoblasts, fibroblasts, stromal cells and/or tendon cells, and also having self-renewal ability. According to the International Society for Cellular Therapy (ISCT), the following three minimal conditions are set forth for defining mesenchymal stem cells: (1) the capability of adhering to and being culturable on plastic under standard culturing conditions, (2) having the immunological feature of being positive for CD105, CD73 and CD90 and negative for CD45, CD34, CD14 or CD11b, CD79a or CD19 and HLA-DR, and (3) exhibiting differentiation potency to osteoblasts, adipocytes and chondroblasts in an in vitro differentiation system; however, there is no limitation to these conditions for the purpose of the present specification. Also, CD29, CD44, CD106 and STRO-1 are additional positive markers for mesenchymal stem cells. Throughout the present specification, the term "mesenchymal stem cells" is interpreted in as wide a sense as possible.

Mesenchymal stem cells are cells isolated from in vivo tissue such as bone marrow, adipose tissue, umbilical cord blood, dental pulp, synovial membrane or placenta, and they may be isolated using a known method.

The pluripotent stem cells used for the invention are preferably in the form of a cell mass produced by three-dimensional suspension culturing while maintaining their undifferentiated state during the differentiation-inducing step. Throughout the present specification, "three-dimensional suspension culture" is a method of culturing cells while stirring or shaking them in medium under non-adhering conditions.

The medium used for three-dimensional suspension culturing to maintain the undifferentiated state of the pluripotent stem cells is not particularly restricted so long as it is medium that can maintain the undifferentiated state of pluripotent stem cells, and examples of such media include commercially available media such as 10 to 15% FBS-containing DMEM/F12 or DMEM medium (such media may also include LIF, penicillin/streptomycin, puromycin, L-glutamine, non-essential amino acids and β-mercaptoethanol as appropriate), mouse ES cell culturing medium (TX-WES medium, Thrombo-X), primate ES cell culturing medium (primate ES/iPS cells medium, ReproCell), serum-free pluripotent stem cell maintenance medium (for example, mTeSR (Stemcell Technology), Essential8 (Life Technologies) and StemFit AK03 (Ajinomoto)).

The medium used for three-dimensional suspension culture to maintain the undifferentiated state of the pluripotent stem cells may also contain an added ROCK inhibitor to inhibit cell death. ROCK inhibitors are not particularly restricted so long as they can inhibit the function of Rho-kinase (ROCK), and examples include Y-27632 (see Ishizaki et al., Mol. Pharmacol. 57, 976-983(2000); Narumiya et al., Methods Enzymol. 325, 273-284(2000)), Fasudil/HA1077 (see Uenata et al., Nature 389:990-994(1997)), H-1152 (see Sasaki et al., Pharmacol. Ther. 93:225-232(2002)), Wf-536 (see Nakajima et al., Cancer Chemother. Pharmacol. 52(4): 319-324(2003)) and their derivatives, as well as antisense nucleic acid, RNA interference inducible nucleic acid (siRNA) and dominant negative mutants for ROCK, and their expression vectors. Other publicly known low molecular compounds may also be used as ROCK inhibitors (see U.S. Patent Application Publication No. 2005/0209261, No. 2005/0192304, No. 2004/0014755, No. 2004/0002508, No. 2004/0002507, No. 2003/0125344, No. 2003/0087919, and International Patent Publication No. 2003/062227, No. 2003/059913, No. 2003/062225, No. 2002/076976 and No. 2004/039796). One or more ROCK inhibitors may also be used for the invention. Y-27632 is a preferred ROCK inhibitor to be used for this step. The concentration of the ROCK inhibitor used in the step may be selected as appropriate by a person skilled in the art depending on the ROCK inhibitor used, and when Y-27632 is used as the ROCK inhibitor, for example, it may be 0.1 µM to 100 µM, preferably 1 µM to 50 µM and even more preferably 5 µM to 20 µM.

The medium used for three-dimensional suspension culture to maintain the undifferentiated state of the pluripotent stem cells may include an added reagent that inhibits adhesion between cell masses or a reagent to maintain the suspended state of the cell masses, examples of such reagents including water-soluble polymers, and more preferably water-soluble polysaccharides (such as methyl cellulose and gellan gum).

Figure 2:
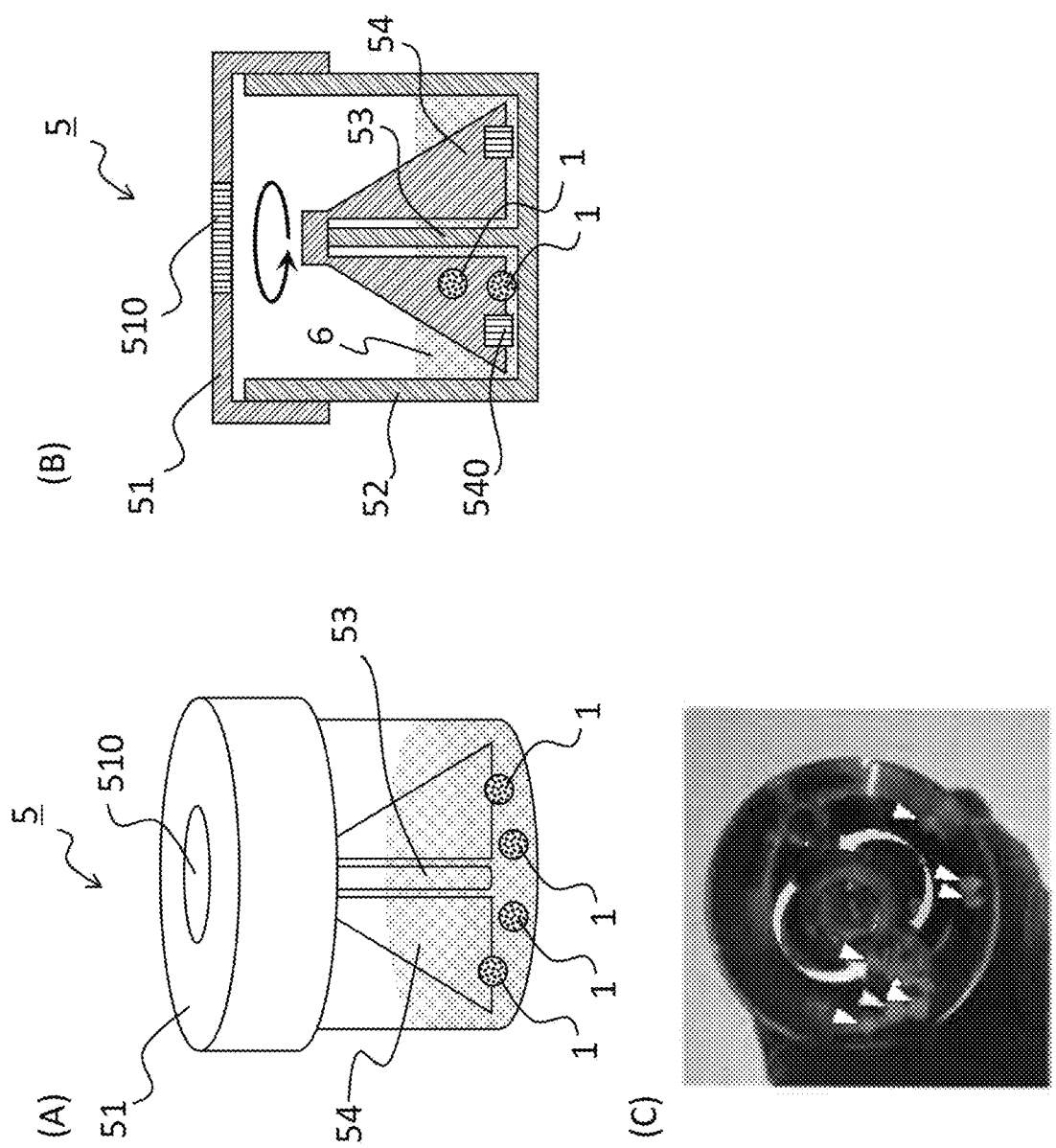
FIG. 2 shows a stirred culture vessel to be used for one embodiment. (A) is a perspective view of the stirred culture vessel. (B) is a cross-sectional view of the stirred culture vessel. (C) is a photograph of the stirred culture vessel from the bottom. The arrowheads indicate cartilage-like tissue.

The culturing vessel used for three-dimensional suspension culture to maintain the undifferentiated state of the pluripotent stem cells is not particularly restricted so long as it is a non-adhesive culture vessel, and examples include a bioreactor, flask, tissue culture flask, dish, petri dish, tissue culture dish, multidish, microplate, microwell plate, multiplate, multi-well plate, chamber slide, petri dish, tube, tray, culture bag and roller bottle. Such vessels may have stirrers or air supply systems included as appropriate. By adjusting the use of gas permeable materials in the culture vessel, and the size and shape of the stirring blade of the stirrer, it is possible to generate an axial stream over the culturing tank and thus eliminate the need for an air supply system. A preferred culturing vessel to be used for three-dimensional suspension culture is a bioreactor by Able Co., equipped with a magnetic stirrer, for example (see FIG. 2).

When a stirrer-equipped culturing vessel is used for three-dimensional suspension culture to maintain the undifferentiated state of pluripotent stem cells, the stirring speed is not particularly restricted so long as the suspended state of the cells can be maintained, and it may be 10 rpm to 95 rpm, preferably 40 rpm to 80 rpm, even more preferably 50 rpm to 70 rpm and most preferably about 60 rpm, for example.

The three-dimensional suspension culture may have a cell density of $1.0 \times 10^4$/ml to $1.0 \times 10^6$/ml and preferably $3.0 \times 10^4$/ml to $1.0 \times 10^5$/ml, for example, and desired cell counts can be prepared by appropriately increasing or decreasing the medium volume.

The culturing temperature for three-dimensional suspension culture to maintain the undifferentiated state of the pluripotent stem cells is not particularly restricted, and may be about 30 to 40° C. and preferably about 37° C., with culturing in an atmosphere of $CO_2$-containing air. The $CO_2$ concentration is about 2 to 5% and preferably about 5%. The culturing period for this step is not particularly restricted so long as a cell mass diameter of no greater than 300 µm is maintained, and as an example it may be a culturing period of at least 3 days and up to 10 days or preferably at least 4 days and up to 7 days, with 5 days being preferred.

The medium used for step (i) above can be prepared by using basal medium used for culturing of animal cells with addition of one or more substances selected from the group consisting of BMP2, TGFβ and GDF5, with HMG-CoA reductase inhibitor. A preferred medium to be used for step (i) is basal medium containing added BMP2, TGFβ, GDF5 and HMG-CoA reductase inhibitor. Examples of basal medium include IMDM medium, Medium 199 medium, Eagle's Minimum Essential Medium (EMEM), αMEM medium, Dulbecco's modified Eagle's Medium (DMEM), Ham's F12 medium, RPMI 1640 medium, Fischer's medium, and mixtures of these media. If necessary, the basal medium may contain other substances such as serum (FBS, for example), albumin, transferrin, KnockOut Serum Replacement (KSR) (FBS serum substitute for ES cell culturing) (Invitrogen), N2 supplement (Invitrogen), B27 supplement (Invitrogen), fatty acids, insulin, sodium selenite, ethanolamine, collagen precursor, trace elements, 2-mercaptoethanol, 3'-thiolglycerol, lipids, amino acids, L-glutamine, GlutaMAX (Invitrogen), non-essential amino acids (NEAA), sodium pyruvate, vitamins, growth factors, low molecular compounds, antibiotics, antioxidants, pyruvic acid, buffering agents and inorganic salts. According to one embodiment of this step, the basal medium is DMEM containing insulin, transferrin, sodium selenite, ethanolamine, ascorbic acid, non-essential amino acids, sodium pyruvate, antibiotics and 1% serum.

BMP2 for step (i) includes BMP2 derived from a human or another animal, or a functional modified form thereof, and a commercially available product from Osteopharma, for example, may be used. The concentration of BMP2 to be used for the step may be 0.1 ng/ml to 1000 ng/ml, preferably 1 ng/ml to 100 ng/ml and more preferably 5 ng/ml to 50 ng/ml, or 10 ng/ml. The BMP2 for the invention may also be replaced by BMP4.

TGFβ for step (i) includes TGFβ derived from a human or another animal, or a functional modified form thereof, and a commercially available product from PeproTech, for example, may be used. The concentration of TGFβ to be used for the step may be 0.1 ng/ml to 1000 ng/ml, preferably 1 ng/ml to 100 ng/ml and more preferably 5 ng/ml to 50 ng/ml, or 10 ng/ml.

In step (i), the amount of TGFβ in the medium with respect to 50 mg of cartilage-like tissue by wet weight may be greater than 0.1 μg, but it is preferably 0.2 μg or greater, more preferably 0.25 μg or greater and even more preferably 0.3 μg or greater. There is no particular restriction on the upper limit, but it may be 1000 ng, for example. The wet weight of the cartilage-like tissue is the weight when it retains the amount of moisture that can be held in the cultured cartilage-like tissue. The wet weight of the cartilage-like tissue can be determined by harvesting cartilage-like tissue from the medium using a spatula, removing as much of the excess moisture as possible using the edge of the culture dish, and performing measurement without drying.

GDF5 for step (i) includes GDF5 derived from a human or another animal, or a functional modified form thereof, and a commercially available product from PeproTech, for example, may be used. The concentration of GDF5 to be used for the step may be 0.1 ng/ml to 1000 ng/ml, preferably 1 ng/ml to 100 ng/ml and more preferably 5 ng/ml to 50 ng/ml, or 10 ng/ml.

Examples of HMG-CoA reductase inhibitors include, but are not limited to, mevastatin (compactin) (U.S. Pat. No. 3,983,140), pravastatin (Japanese Unexamined Patent Publication SHO No. 57-2240 (U.S. Pat. No. 4,346,227)), lovastatin (Japanese Unexamined Patent Publication SHO No. 57-163374 (U.S. Pat. No. 4,231,938)), simvastatin (Japanese Unexamined Patent Publication SHO No. 56-122375 (U.S. Pat. No. 4,444,784)), fluvastatin (Japanese Patent Public Inspection SHO No. 60-500015 (U.S. Pat. No. 4,739,073)), atorvastatin (Japanese Unexamined Patent Publication HEI No. 3-58967 (U.S. Pat. No. 5,273,995)), rosuvastatin (Japanese Unexamined Patent Publication HEI No. 5-178841 (U.S. Pat. No. 5,260,440)), and pitavastatin (Japanese Unexamined Patent Publication HEI No. 1-279866 (U.S. Pat. Nos. 5,854,259 and 5,856,336)). The HMG-CoA reductase inhibitor for the invention is preferably a drug selected from the group consisting of mevastatin, atorvastatin, pravastatin, rosuvastatin, fluvastatin and lovastatin, with rosuvastatin being most preferred.

When rosuvastatin is used as the HMG-CoA reductase inhibitor in step (i), the concentration may be 0.01 μM to 100 μM, preferably 0.1 μM to 10 μM, and more preferably 0.5 μM to 5 μM, or 1 μM.

For step (i), bFGF may also be added to the basal medium, in which case the bFGF includes bFGF derived from a human or another animal, or a functional modified form thereof, and a commercially available product from Wako Co., for example, may be used. The concentration of bFGF to be used for the step may be 0.1 ng/ml to 1000 ng/ml, preferably 1 ng/ml to 100 ng/ml and more preferably 5 ng/ml to 50 ng/ml, or 10 ng/ml.

A pterosin derivative may also be added to the basal medium in step (i), the pterosin derivative described in U.S. Ser. No. 14/315,809 being one example, and pterosin B being preferred. The concentration of pterosin B used in this step may be 10 μM to 1000 μM, and is preferably 100 μM to 1000 μM.

Culturing under adhesive conditions for the purpose of the present specification is culturing of the cells in a state where they are able to adhere to the culture dish, and it may be carried out using a culture vessel that has been surface-treated to be suitable for cell adhesion. Such a surface-treated culture vessel may be one that is commercially available, such as a tissue culture dish by Iwaki Corp. As another mode, a culture vessel that has been coated with extracellular matrix may be used for the culturing. The coating treatment may be carried out by placing an extracellular matrix-containing solution in the culture vessel and then appropriately removing the solution.

As used herein, "extracellular matrix" means the supramolecular structure present outside of cells, and it may be naturally occurring or artificial (recombinant). Examples include substances such as polylysine, polyornithine, collagen, proteoglycans, fibronectin, hyaluronic acid, tenascin, entactin, elastin, fibrillin and laminin, as well as their fragments. These extracellular matrix substances may also be used in appropriate combinations.

The culturing temperature for step (i) is not particularly restricted, and may be about 30 to 40° C. and preferably about 37° C., with culturing in an atmosphere of $CO_2$-containing air. The $CO_2$ concentration is about 2 to 5% and preferably about 5%. The culturing time for step (i) may be between 7 and 28 days, between 10 and 25 days or between 10 and 20 days, and is preferably 14 days.

In step (ii), the cells obtained in step (i) may be detached from the culture vessel and suspension cultured. The method for detaching the cell culture in step (ii) is preferably a mechanical detachment method (such as pipetting, or a method using a scraper), and is preferably not a method that uses a detachment solution with protease activity and/or collagenase activity (for example, the trypsin- and collagenase-containing solutions Accutase™ or Accumax™ (Innovative Cell Technologies, Inc).

Culturing under suspension conditions for step (ii) is culturing in a state where the cells do not adhere to the culture dish, and it is not particularly restricted but is preferably carried out using a culture vessel (such as a petri dish) that has not been artificially treated to improve adhesion with cells (such as coating treatment with extracellular matrix, for example), or using a culture vessel that has been artificially treated to prevent adhesion (coating treatment with polyhydroxyethylmethacrylic acid (poly-HEMA), for example).

The medium used in step (ii) may be the same medium mentioned for step (i) above.

The culturing temperature for step (ii) is not particularly restricted, and may be about 30 to 40° C. and preferably about 37° C., with culturing in an atmosphere of $CO_2$-containing air. The $CO_2$ concentration is about 2 to 5% and preferably about 5%. The culturing time for this step may be 2 weeks to 18 weeks or 6 weeks to 18 weeks, and is more preferably 10 weeks to 15 weeks. The culturing period is preferably a period until the desired chondrocytes are obtained, which may be adjusted while appropriately confirming production of the chondrocytes. The method for confirming the chondrocytes according to the invention may be carried out by harvesting some of the obtained cartilage particles and confirming whether or not they are stained with Safranin O.

The Safranin O staining can be carried out by the following method. The cartilage-like tissue is fixed with 4% paraformaldehyde and then embedded in paraffin to prepare a tissue section. The paraffin-embedded tissue section is deparaffinized, treated for 3 minutes in iron hematoxylin solution (Weigert's iron hematoxylin, Millipore Co., HX73929273), and rinsed for 1 minute with flowing water. It is then immersed for 3 seconds in 1% aqueous acetic acid and reacted for 5 minutes in an aqueous solution of 0.05% Fast Green FCF (Wako Pure Chemical Industries, Ltd., 061-00031). After rinsing for 3 seconds in 1% aqueous acetic acid, it is reacted for 5 minutes in an aqueous solution of 0.1% Safranin O (Waldeck 1B-463). It is then immersed in 70% ethanol, 100% ethanol and xylene (3 tanks) to remove the moisture, and then encapsulated with an encapsulant and cover glass.

The properties of the cartilage-like tissue can be confirmed by type 2 collagen staining. The type 2 collagen staining can be accomplished by the following method. The cartilage-like tissue is fixed with 4% paraformaldehyde and then embedded in paraffin to prepare a tissue section. The paraffin-embedded tissue section is deparaffinized, immersed in 1 mM EDTA PBS (pH8.0), and incubated for 15 minutes at 80° C. for antigen activation. The tissue section is then rinsed with PBS, and after adding 10 mg/mL hyaluronidase, it is treated for 40 minutes at room temperature and rinsed with PBS. A DAB kit (CSA II Biotin-free Tyramide Signal Amplification System, Dako) is used for 5 minutes of treatment with Peroxidase block (DAB kit, step 1), and after rinsing with PBS, for another 5 minutes of treatment with Protein block (DAB kit, step 2). Next, anti-type 2 collagen antibody (Thermo Scientific, #MS-235-PO, AB-2, Clone 2B1.5, 1:1000 dilution) is added and the mixture is reacted overnight at 4° C. After rinsing with PBS, secondary antibody (DAB kit, step 4, mouse) is added and treatment is carried out for 15 minutes. After rinsing with PBS, treatment is carried out for 15 minutes with Amplification reagent (DAB kit, step 5). After further rinsing with PBS, treatment is carried out for 15 minutes with anti-florescent HRP (DAB kit, step 6). This is followed by further rinsing with PBS, and coloring with DAB substrate buffer and DAB chromo (DAB kit, step 7). The mixture is immersed in 70% ethanol, 80% ethanol, 95% ethanol, 100% ethanol and xylene (3 tanks) to remove the moisture, and then encapsulated with a mounting medium and cover glass.

The present invention also includes a step of applying mechanical stimulation to the cartilage-like tissue induced from pluripotent stem cells, in medium. With a step of applying mechanical stimulation, the cartilage-like tissue, and especially the superficial zone periphery (such as the non-central region), is stimulated, promoting expression of lubricin and producing cartilage-like tissue with lubricin localized in the superficial zone periphery (such as the non-central region). The medium used in the step of applying mechanical stimulation may be the same medium mentioned for step (i) above. The step of applying mechanical stimulation is preferably a step of applying shear force, and more preferably a step of applying shear force from all directions of the outer periphery of the tissue. According to one embodiment, the shear force is applied by stirring means. The stirring means used may be a stirred bioreactor, for example. The culture vessel used in a stirred bioreactor may be a commercially available roller bottle or spinner flask, for example, and is preferably a stirred culture vessel having one or more stirring blades, an example of which is a bioreactor by Able Co. (Japan) equipped with a magnetic stirrer, as can be used in step (i) as well (see FIG. 2). By using a stirred bioreactor with one or more stirring blades it is possible to efficiently contact cartilage-like tissue induced from pluripotent stem cells with the stirring blades and/or the bottom face and inner wall surface of the culture vessel of the stirred bioreactor, thereby effectively applying shear force to the cartilage-like tissue.

The stirred culture vessel 5 used according to one embodiment of the invention is provided with one or more stirring blades 54 (two in FIG. 2) that rotate centered around a column 53 that is provided vertically from the bottom face of the container body 52. The number of stirring blades 54 is not particularly restricted and may be 1, 2, 3, 4, 5, 6, 7, 8, 9 or 10 or more. The stirring blades 54 are provided with a magnet 540, with the stirring blade 54 rotating by a magnetic stirrer (not shown). The bottom of the stirring blades 54 is formed essentially parallel with the bottom face of the container body 52, and it has a gap to the extent that the cartilage-like tissue 1 is not caught under the bottom parts of the stirring blades 54. The outer portions of the stirring blades 54 are designed to not contact with the inner wall of the container body 52, with a gap to the extent that the cartilage-like tissue 1 is not caught therebetween. By rotating the stirring blades 54 it is possible to efficiently contact the cartilage-like tissue 1 with the bottom face and inner wall of the container body 52, allowing mechanical stimulation and particularly shear force to be applied to the surface of the cartilage-like tissue 1. Mechanical stimulation, and particularly fluid shear force, can also be applied between the cartilage-like tissue 1 and medium.

The stirring speed of the stirred bioreactor is not particularly restricted so long as it allows shear force to be applied to the cartilage-like tissue 1, and it may be 10 rpm to 95 rpm, preferably 40 rpm to 80 rpm, more preferably 50 rpm to 70 rpm and most preferably about 60 rpm.

According to one embodiment, the time period for the step of applying the mechanical stimulation may be a period sufficient to cause lubricin to be localized in the superficial zone periphery (such as the non-central region) of the cartilage-like tissue, and it may be at least 3 days, preferably at least 14 days and more preferably at least 28 days, for example.

According to one embodiment, the amount of cartilage-like tissue induced from pluripotent stem cells before localization of lubricin, to be used in the step of applying mechanical stimulation, may be an amount sufficient to cause lubricin to be localized in the superficial zone periphery (such as the non-central region) of the cartilage-like tissue, and it may be less than or equal to 100 mg per 30 mL of medium preferably less than or equal to 60 mg per 30 mL of medium, for example. According to one embodiment, the size of the cartilage-like tissue induced from pluripotent stem cells before localization of lubricin, to be used in the step of applying mechanical stimulation, is not particularly restricted, but the lower limit for the maximum diameter is preferably 0.5 mm or greater, more preferably 1 mm or greater and even more preferably 2 mm, for example. The upper limit for the maximum diameter is preferably 10 mm or smaller and more preferably 6 mm or smaller, for example. The range for the maximum diameter may be 0.5 mm to 10 mm, preferably 1 mm to 6 mm and more preferably 2 mm to 5 mm. If the cartilage-like tissue induced from pluripotent stem cells has a size in these ranges the specific gravity will be greater than that of the medium and it will be possible to cause it to be suspended near the bottom face of the culture vessel even when it is in the medium. This will allow the cartilage-like tissue to be cultured while rotating it on the bottom face of the culture vessel, so that mechanical stimulation (and particularly shear force) can be efficiently applied to the surface of the cartilage-like tissue.

According to one embodiment, the size of the cartilage-like tissue surface after localization of lubricin, and after application of mechanical stimulation, is not particularly restricted, but the lower limit for the maximum diameter is preferably 0.5 mm or greater, more preferably 1 mm or greater and even more preferably 2 mm, as an example. The upper limit for the maximum diameter is preferably 10 mm or smaller and more preferably 6 mm or smaller, for example. The range for the maximum diameter may be 0.5 mm to 10 mm, preferably 1 mm to 6 mm and more preferably 2 mm to 5 mm, for example. Cartilage-like tissue having a size in these ranges will be able to fill in a variety of different shapes of sites that have loss of human cartilage, and particularly knee cartilage.

According to one embodiment, the PRG4 expression level of the lubricin localized cartilage-like tissue with respect to the cartilage-like tissue induced from pluripotent stem cells increases by 3 times or more, before and after the step of applying mechanical stimulation. The PRG4 expression level may be the expression level of lubricin protein or the expression level of PRG4 mRNA. If the PRG4 expression level of lubricin localized cartilage-like tissue with respect to the cartilage-like tissue induced from pluripotent stem cells increases by 3 times or more before and after the step of applying mechanical stimulation, the obtained cartilage-like tissue will have lubricin localized in the superficial zone periphery (such as the non-central region).

The present invention provides a composition for treatment of articular cartilage injury that includes lubricin localized cartilage-like tissue obtained by the method described above. One example of a method of administering a drug to a patient is a method of hardening lubricin localized cartilage-like tissue obtained by the method described above using fibrin paste, and administering it to a site of cartilage loss in a patient, as lubricin localized cartilage-like tissue of a size suited for the site of administration. Other examples include a method of mixing lubricin localized cartilage-like tissue with gelatin gel and/or collagen gel and/or hyaluronic acid gel, and administering it to an affected part, or a method of administering lubricin localized cartilage-like tissue to the affected part and fixing it with periosteum or the like.

A disease to be treated by the composition of the invention may be loss of facial cartilage, including nasal cartilage or auricle cartilage, or articular cartilage, with the condition of articular cartilage injury being the preferred target of treatment.

The lubricin localized cartilage-like tissue in the composition of the invention is not particularly restricted so long as its graft survives after administration, and it may be prepared by appropriately increasing or decreasing it to match the size of the affected part or the size of the body.

The present invention will now be described in greater detail by examples, with the understanding that the invention is not limited thereto.

EXAMPLES

Example 1

1. Method
1-1. Induction of Chondrocytes Using Human iPS Cells

The cell line QHJI01s04 established by the method described in Nakagawa M, et al, Sci Rep. 4:3594(2014) was acquired from the Center for iPS Cell Research, Kyoto University, for use as human iPS cells.

Cartilage-like tissue was prepared from human iPS cells following the method described in WO2016/133208, and used to prepare lubricin localized cartilage-like tissue subsequently.

1-2. Production of Lubricin Localized Cartilage-Like Tissue

About 50 mg of the cartilage-like tissue obtained in 1-1 (from 5 to 10 cartilage-like tissue) was transferred to a 30 mL bioreactor (BWV-503A, Able Co.), and then 30 mL of the cartilage differentiation medium used in 1-1 above was added, a 6 cm magnetic stirrer (BWS-S03N05-6, Able Co.) for application of shear force stimulation was used with rotation at 60 rpm, and culturing was carried out for 30 days under conditions of 37° C., 5% $CO_2$. The medium was exchanged with fresh cartilage differentiation medium every 2 or 3 days during the culturing period.

Figure 3A:
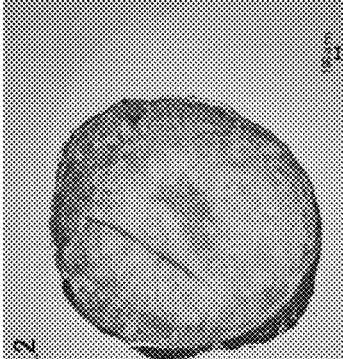
FIG. 3A shows lubricin immunostained images of cartilage-like tissue sections.

1-3. Immunostaining and Safranin O Staining of Lubricin Localized Cartilage-Like Tissue The cartilage-like tissue obtained by the method of 1-2 above (before shear force stimulation (day 0) and after shear force stimulation (day 30)) was fixed with 4% paraformaldehyde and then embedded in paraffin to prepare a tissue section. The paraffin-embedded tissue section was deparaffinized, immersed in 1 mM EDTA PBS (pH8.0), and incubated for 15 minutes at 80° C. for antigen activation. The tissue section was then rinsed with PBS, and after adding 10 mg/mL hyaluronidase, it was treated for 40 minutes at room temperature and rinsed with PBS. A DAB kit (CSA II Biotin-free Tyramide Signal Amplification System, Dako) was used for 5 minutes of treatment with Peroxidase block (DAB kit, step 1), and after rinsing with PBS, for another 5 minutes of treatment with Protein block (DAB kit, step 2). Anti-lubricin-mouse antibody (Millipore, #MABT400, Clone5C11, 1:500 dilution) was then added and reaction was carried out overnight at 4° C. After rinsing with PBS, secondary antibody (DAB kit, step 4, mouse) was added and treatment was carried out for 15 minutes. After further rinsing with PBS, treatment was carried out for 15 minutes with Amplifcation reagent (DAB kit, step 5). After still further rinsing with PBS, treatment was carried out for 15 minutes with anti-florescent HRP (DAB kit, step 6). The mixture was then additionally rinsed with PBS, after which DAB substrate buffer and DAB chromo (DAB kit, step 7) were used for coloring and the mixture was encapsulated with cover glass and an image was taken (FIG. 3A). A different slice was stained with Safranin O (FIG. 3B).

1-4. Quantitative Analysis of Lubricin Localization in Cartilage-Like Tissue

Image J (National Institutes of Health, ver. 1.51) was used according to the following protocol to determine the immunostaining concentration ratio for peripheral region (non-central region)/central region (FIG. 4). The superficial zone peripheral area was calculated by the following formula.

Superficial zone peripheral area (μm)=Tissue long diameter (mm)×(1−central region diameter/tissue long diameter)×1000

(1) Gray-scale conversion of RGB image by Image>Type>32 bit (YUV-weighted)
(2) Black-white reversal by Edit>Invert
(3) Drawing of ROI with polygonal tool inscribed in tissue, Analyse>measure (measurement of total tissue Area and Mean gray value)
(4) Selection of central region with circular tool, Analyse>measure (measurement of central region Area and Mean gray value)
(5) Selection of background with circular tool, Analyse>measure (measurement of back Mean gray value).
(6) Calculation of peripheral region Mean gray value by the following formula:

(Total tissue Area×Mean gray value)−(central region Area×Mean gray value)/(total tissue Area−central region Area)

(7) Calculation of ratio of value of Mean gray value for peripheral region/central region minus background, by the following formula:

(Mean gray value of peripheral region−Mean gray value of background)/(Mean gray value of central region−Mean gray value of background)

2. Results

The cartilage-like tissue after stirring for 30 days was found to have more lubricin localized in the peripheral region than the cartilage-like tissue before stirring (day 0, comparative example) (FIGS. 3A and 4).

Example 2

Figure 5B:
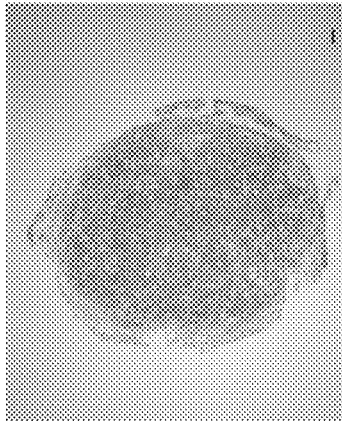
FIG. 5B shows Safranin O stained images of cartilage-like tissue sections.
Figure 7:
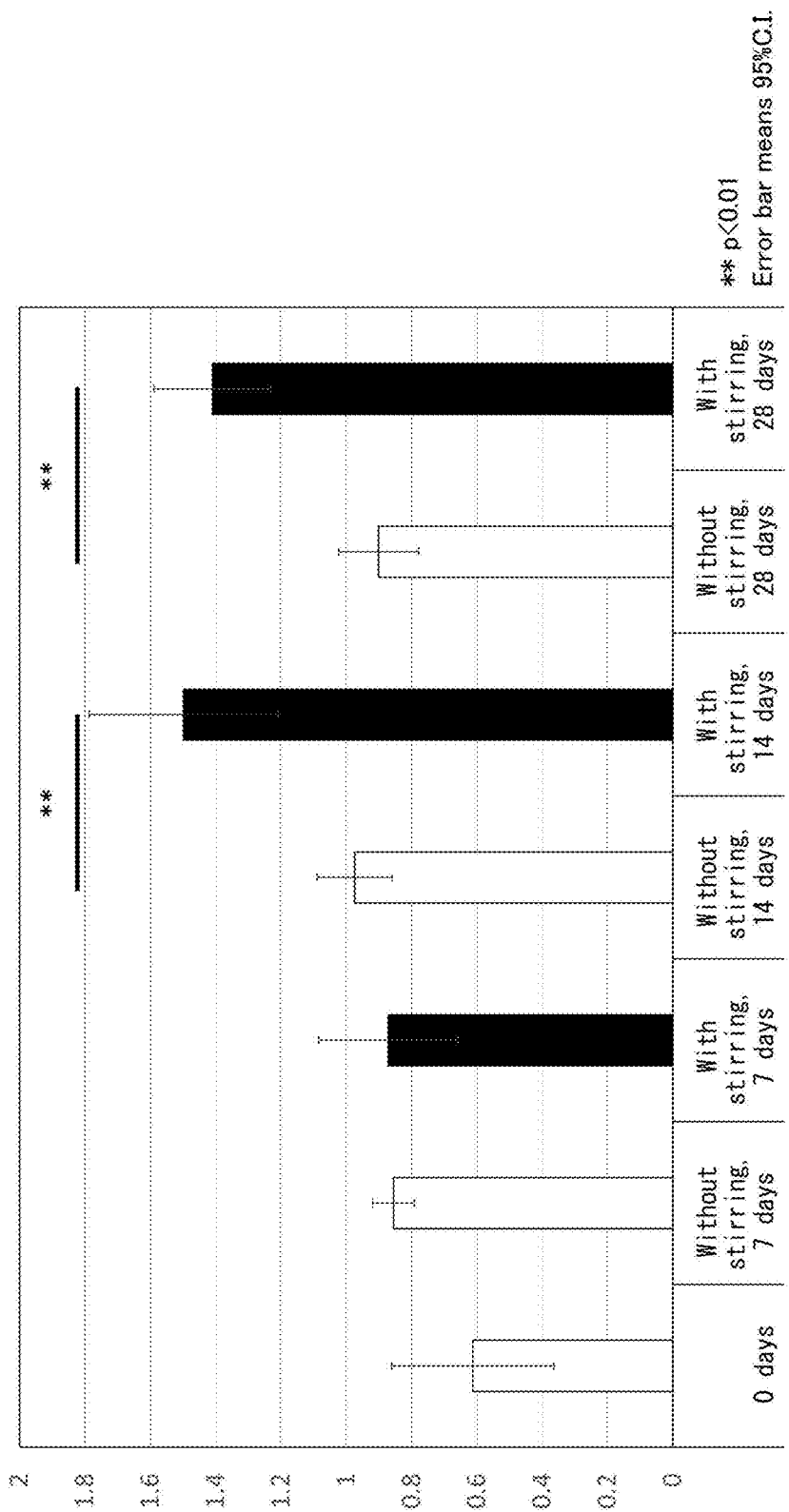
FIG. 7 is a graph showing mean gray value-BG ratios (peripheral region/central region), calculated from the lubricin immunostained image of FIG. 5A.

Culturing of cartilage-like tissue was carried out for 1 week, 2 weeks or 4 weeks using the same procedure as Example 1, under conditions either with or without stirring. Using the same procedure as Example 1, the obtained cartilage-like tissue was subjected to immunohistochemical staining with anti-lubricin antibody and Safranin O staining, and image analysis was performed (FIGS. 5 to 7). As a result, lubricin was found to be localized in the peripheral region in the cartilage-like tissue cultured for 2 weeks (14 days) or longer (FIG. 7).

Example 3

Figure 8:
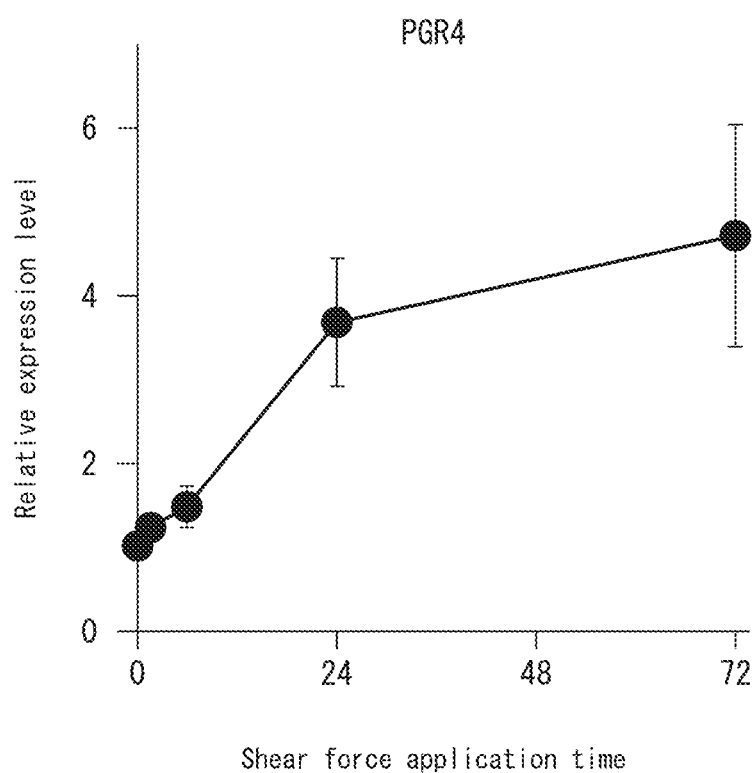
FIG. 8 is a graph showing relative expression levels of PRG4 mRNA for cartilage-like tissue subjected to shear force.

Stir-cultured cartilage-like tissue was periodically collected by the same procedure as Example 1 (0 hours, 2 hours, 6 hours, 24 hours and 72 hours). The obtained cartilage-like tissue was frozen with liquid nitrogen and disrupted with Multi Beads Shocker (Yasui Kikai, Osaka, Japan), and the total RNA was extracted using Qiazol® (Qiagen)) and an RNeasy Mini Kit (Qiagen). The total RNA was treated with DNase to remove the genomic DNA, and 250 ng of the total RNA was reverse transcribed using ReverTra Ace® qPCR RT Master Mix (Toyobo, Tokyo, Japan) to prepare cDNA. A KAPA SUBR FAST qPCR kit Master Mix ABI Prism (KAPA Biosystems, MA, USA) was used for PCR amplification. The PRG4 primer used was TaqMan ID:Hs0160665_g1, and the control GAPDH primer used was TaqMan ID:Hs03929097_g1. The RNA expression level was normalized with the GAPDH level. The results were calculated in terms of relative expression level with respect to the cartilage-like tissue before stirring (0 hours). As a result, the cartilage-like tissue that had been stir-cultured for 24 hours or longer was confirmed to have the PRG4 expression level increased by at least 3-fold (FIG. 8).

REFERENCE SIGNS LIST

1 Cartilage-like tissue
2 First center of gravity
21 Center of gravity region
3 First maximum diameter
4 Cross-section
41 Second center of gravity
42 Second maximum diameter
43 Central region diameter
44 Central region
45 Non-central region
5 Stirred culture vessel
51 Cover
510 Air-permeable filter
52 Container body
53 Column
54 Stirring blade
540 Magnet
6 Medium

The invention claimed is:

1. Lubricin localized cartilage-like tissue, wherein:
in an arbitrary cross-section running through: a first center of gravity of the cartilage-like tissue that has been induced from pluripotent stem cells; or a center of gravity region which is the region inside of a concentric sphere centered on the first center of gravity and having a diameter that is the maximum diameter of the cartilage-like tissue induced from the pluripotent stem cells ("first maximum diameter")×0.2,
the ratio of the lubricin expression level per unit area contained in the central region which is the region inside of a concentric circle centered on a second center of gravity as the center of gravity of the cross-section and having a diameter that is the maximum diameter of the cross-section ("second maximum diameter")×0.4 to 0.9 ("the central lubricin level"), and the lubricin expression level per unit area contained in the non-central region outside of the central region ("the non-central lubricin level") is:
non-central lubricin level/central lubricin level>1, and the lubricin is thus localized.

2. The lubricin localized cartilage-like tissue according to claim 1, wherein the pluripotent stem cells are embryonic stem (ES) cells, embryonic stem cells from cloned embryos obtained by nuclear transfer (ntES cells) or induced pluripotent stem (iPS) cells.

3. The lubricin localized cartilage-like tissue according to claim 1, wherein the non-central lubricin level/central lubricin level ratio is greater than 1.3.

4. Lubricin localized cartilage-like tissue that has been induced from pluripotent stem cells, wherein:
lubricin has been expressed in the cartilage-like tissue;
a ratio of the lubricin expression level per unit area contained in a planar "central region" of the tissue ("central lubricin level") and the lubricin expression level per unit area contained in a planar "non-central region" outside of the central region ("non-central lubricin level") is as follows:

non-central lubricin level/central lubricin level>1; and the central region and non-central region of the tissue are determined as follows:

in an arbitrary cross-section running through (i) a first center of gravity of the cartilage-like tissue; or (ii) a concentric sphere centered on the first center of gravity and having a diameter that is the maximum diameter of the cartilage-like tissue ("first maximum diameter")× 0.2, the central region is the region inside of a concentric circle of the arbitrary cross-section and centered on a second center of gravity, the concentric circle having a diameter that is the maximum diameter of the cross-section ("second maximum diameter")×0.4 to 0.9, the second center of gravity being the same as the first center of gravity when the arbitrary cross-section runs through the first center of gravity, and the non-central region is the area of the arbitrary cross section outside the central region.

5. The lubricin localized cartilage-like tissue according to claim 1, wherein the lubricin is expressed in at least 50% of the entire outer periphery of the tissue.

6. The lubricin localized cartilage-like tissue according to claim 1, wherein the lubricin localized cartilage-like tissue is approximately spherical.

* * * * *